United States Patent [19]

Inoue

[11] Patent Number: 5,710,954
[45] Date of Patent: Jan. 20, 1998

[54] CAMERA SYSTEM HAVING FUNCTION FOR PHOTOGRAPHING IMAGE LINKED TO ELECTRONIC IMAGE

[75] Inventor: Akira Inoue, Hachioji, Japan

[73] Assignee: Olympus Optical Co., Ltd., Tokyo, Japan

[21] Appl. No.: 757,596

[22] Filed: Nov. 29, 1996

Related U.S. Application Data

[63] Continuation of Ser. No. 384,535, Feb. 8, 1995, abandoned.

[30] Foreign Application Priority Data

Feb. 17, 1994 [JP] Japan .................... 6-020470
Mar. 25, 1994 [JP] Japan .................... 6-055495
Apr. 5, 1994 [JP] Japan .................... 6-066907

[51] Int. Cl.⁶ ............................................ G03B 17/24
[52] U.S. Cl. ................... 396/374; 348/333; 348/334; 355/41; 396/373
[58] Field of Search ............................ 396/373, 374; 348/334, 333; 355/41

[56] References Cited

U.S. PATENT DOCUMENTS

| | | | |
|---|---|---|---|
| 4,888,605 | 12/1989 | Matsumoto | 396/374 |
| 4,939,581 | 7/1990 | Shalit | 358/224 |
| 5,023,650 | 6/1991 | Hoshino et al. | 354/219 |
| 5,157,482 | 10/1992 | Cosgrove | 356/41 |
| 5,164,833 | 11/1992 | Aoki | 358/224 |
| 5,172,151 | 12/1992 | Yomogizawa et al. | 354/219 |
| 5,300,974 | 4/1994 | Stephenson, III | 354/105 |
| 5,404,196 | 4/1995 | Terashita et al. | 355/41 |
| 5,461,440 | 10/1995 | Toyoda et al. | 354/106 |
| 5,486,893 | 1/1996 | Takagi | 354/219 |

FOREIGN PATENT DOCUMENTS

| | | |
|---|---|---|
| 61-39009 | 2/1986 | Japan . |
| 63-120241 | 8/1988 | Japan . |
| 63-260638 | 10/1988 | Japan . |
| 64-49031 | 2/1989 | Japan . |
| 1-133038 | 5/1989 | Japan . |

*Primary Examiner*—Safet Metjahic
*Assistant Examiner*—Michael Dalakis
*Attorney, Agent, or Firm*—Frishauf, Holtz, Goodman, Langer & Chick

[57] ABSTRACT

A camera system capable of displaying a recorded object image and recording processing information for printing of the recorded object image. The camera includes a camera body into which a film can be loaded and fed therein, and an exposure device for focusing an object image on the film and for exposing the film to light in response to a shutter-releasing operation to record the object image on the film. The camera further includes an information storage device for storing a video image substantially equivalent to the recorded object image at a timing substantially similar to a timing of the exposure device, a reproduction device for reproducing the video image stored in the information storage device after an operation of the exposure device, and an electronic viewfinder for displaying the reproduced video image. A processing information inputting device is provided for inputting processing information for printing the object image recorded on the film on the basis of the video image displayed by the electronic viewfinder, and a recording device is provided for recording the processing information input by the processing information inputting device as the film is fed within the camera body.

2 Claims, 32 Drawing Sheets

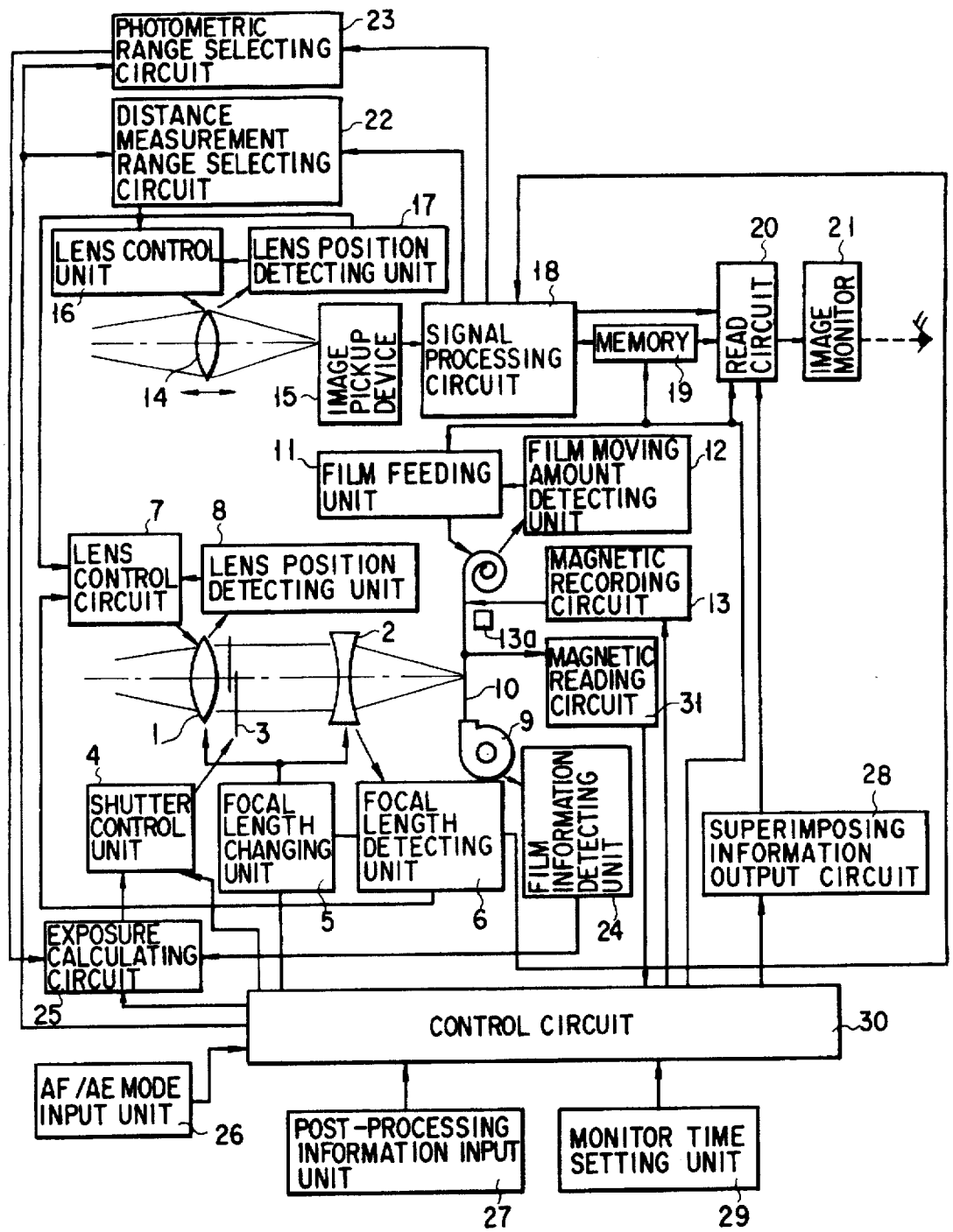
F I G. 1

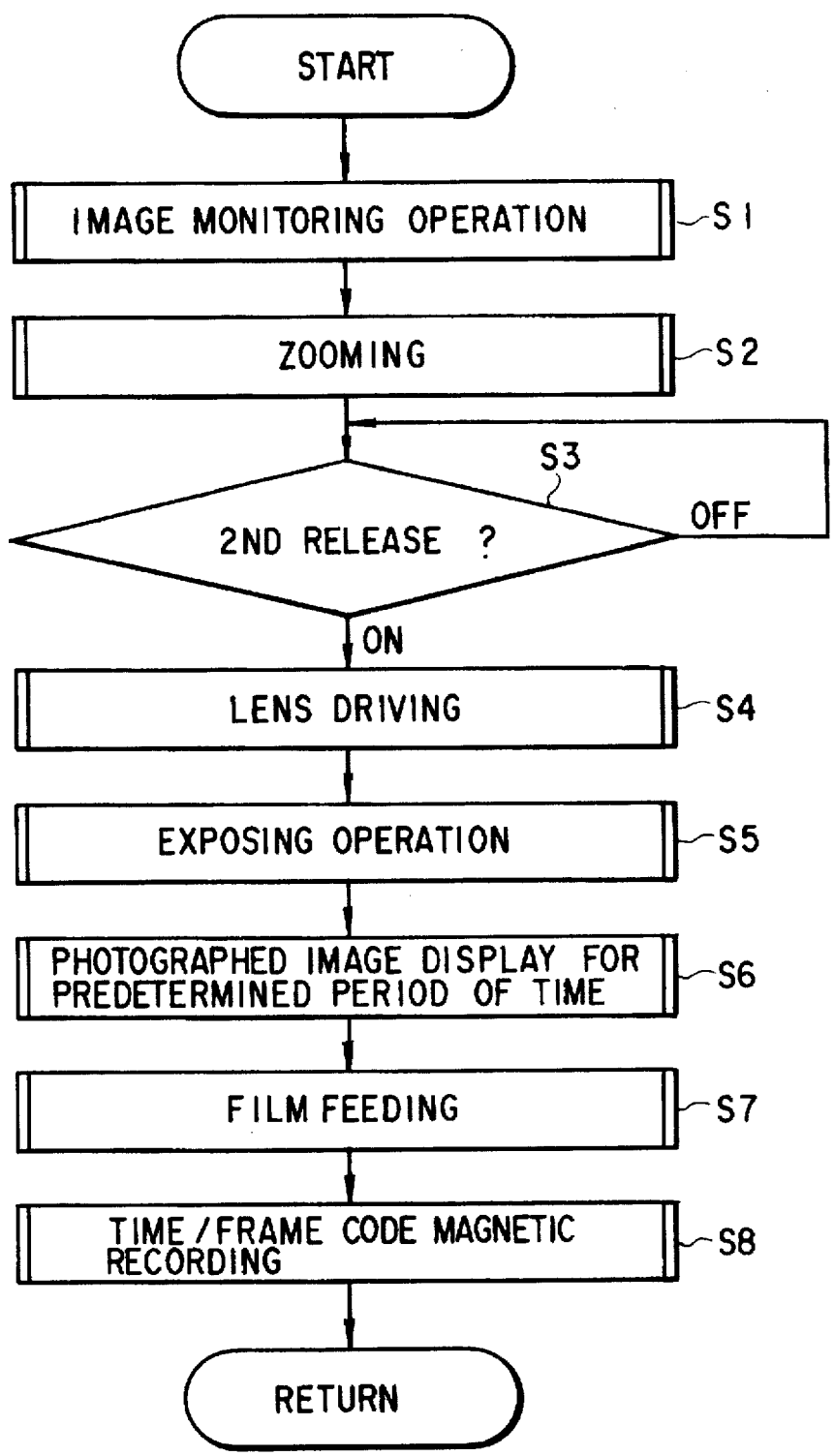
F I G. 2

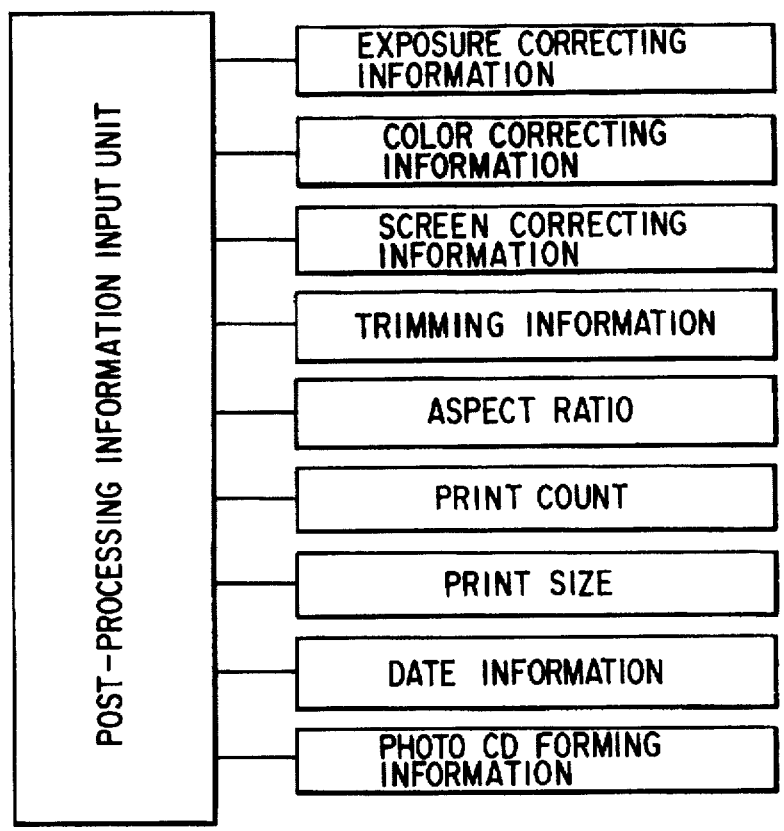
F I G. 6
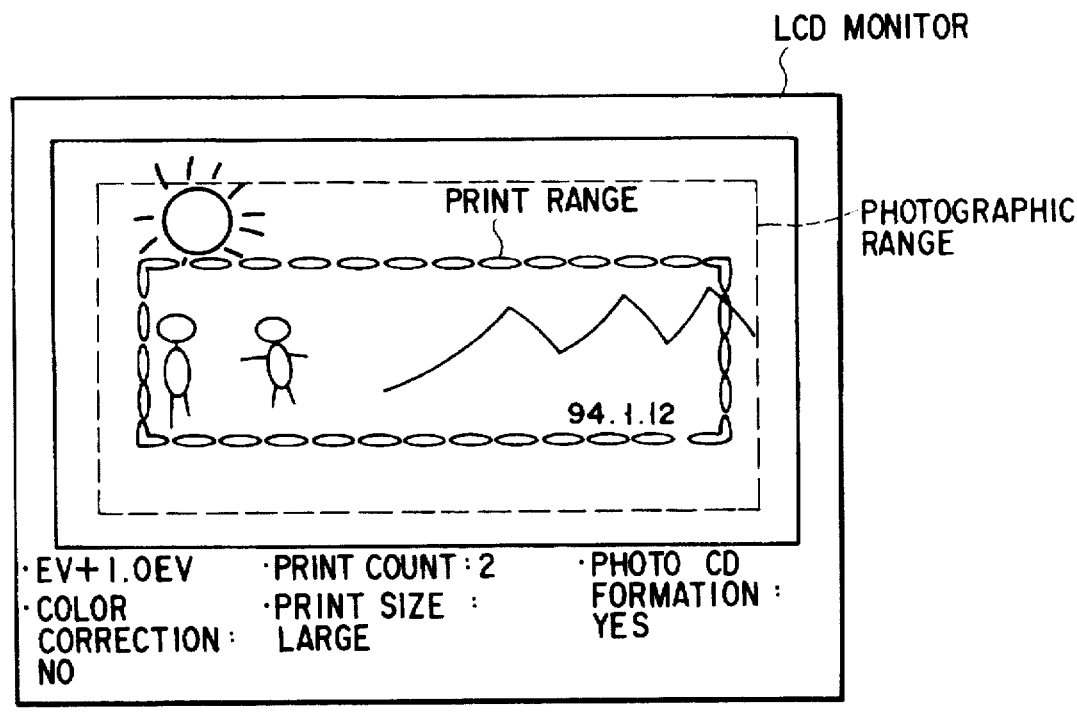
F I G. 7

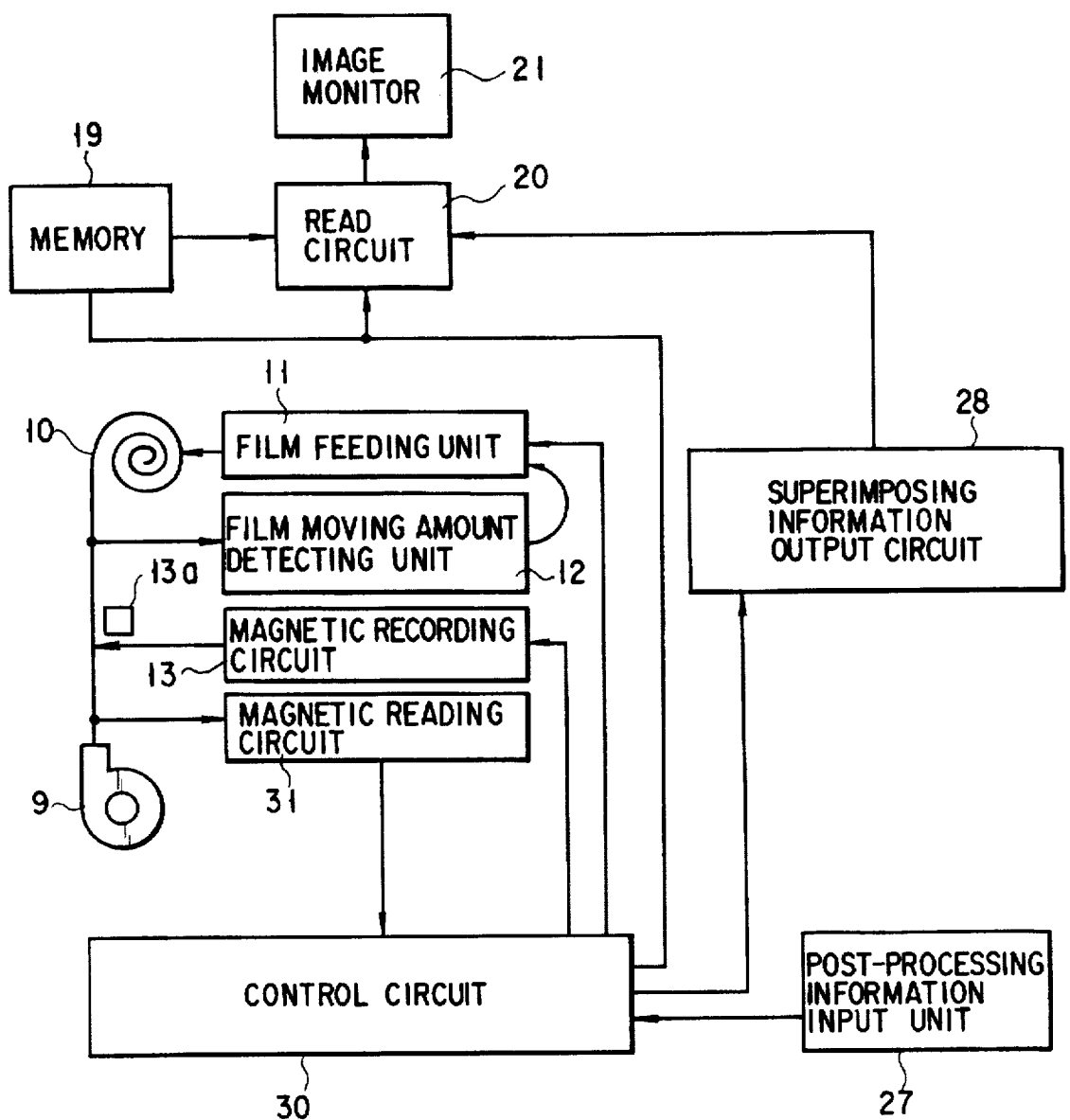
F I G. 9

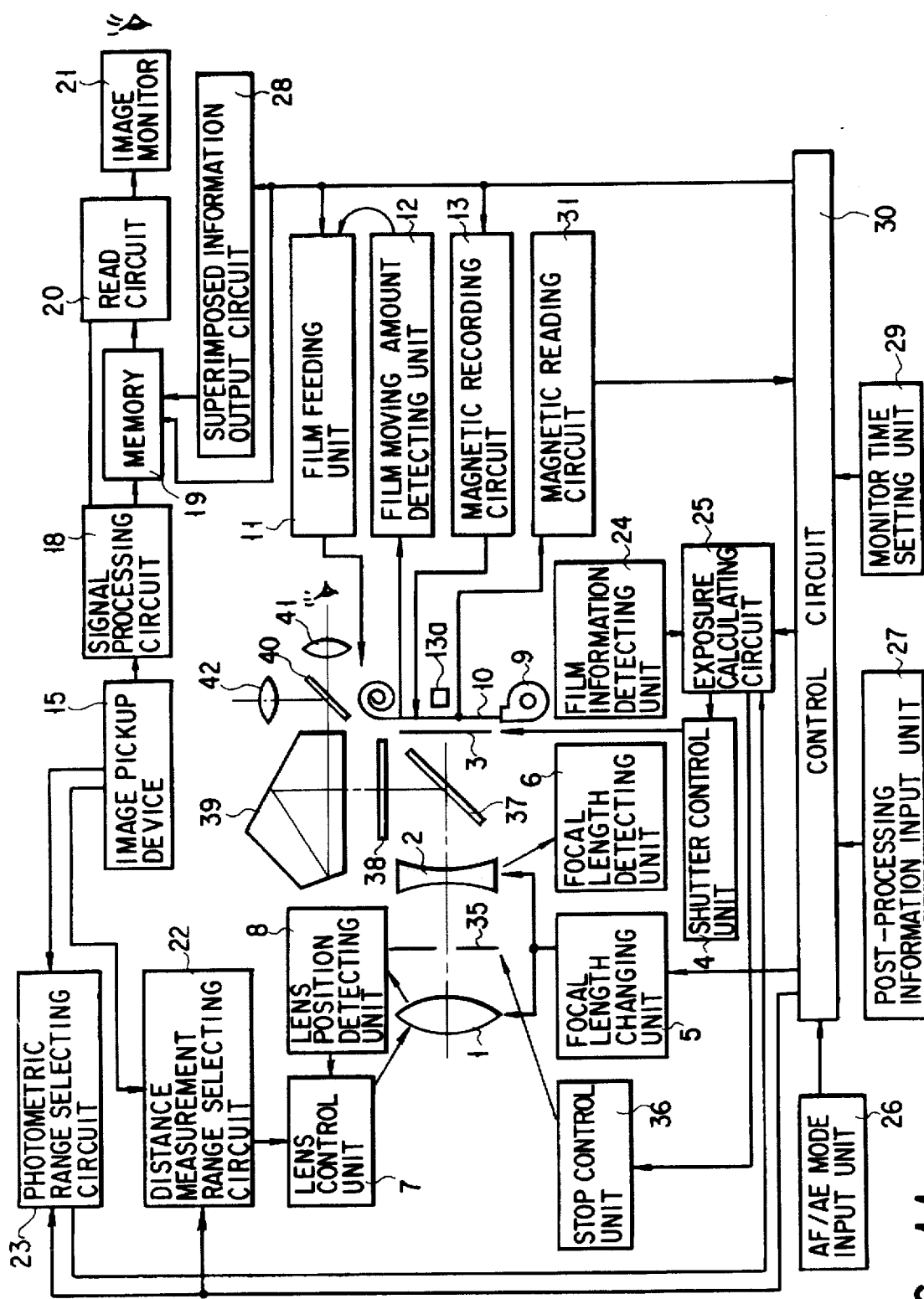
F I G. 11

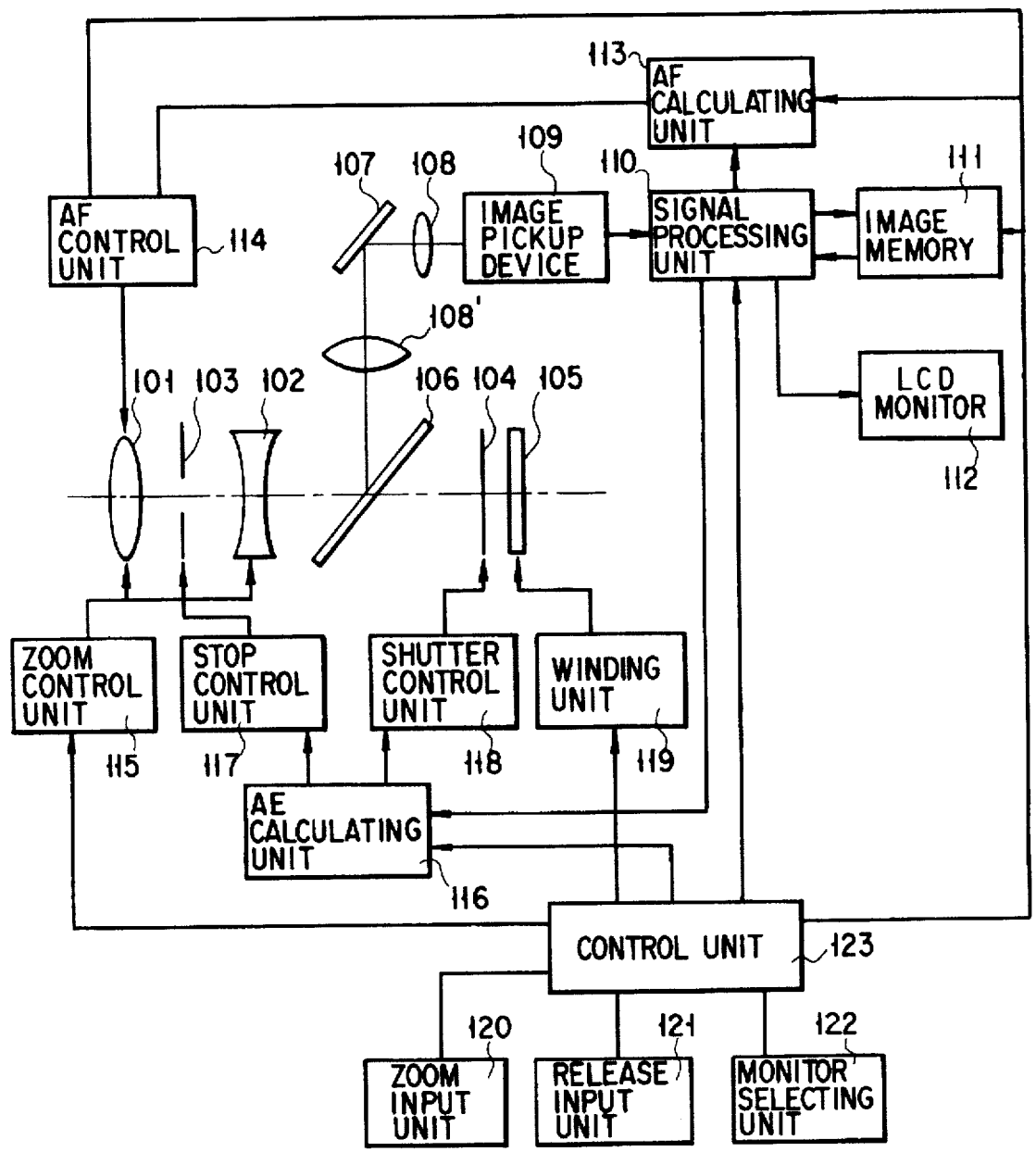
F I G. 12

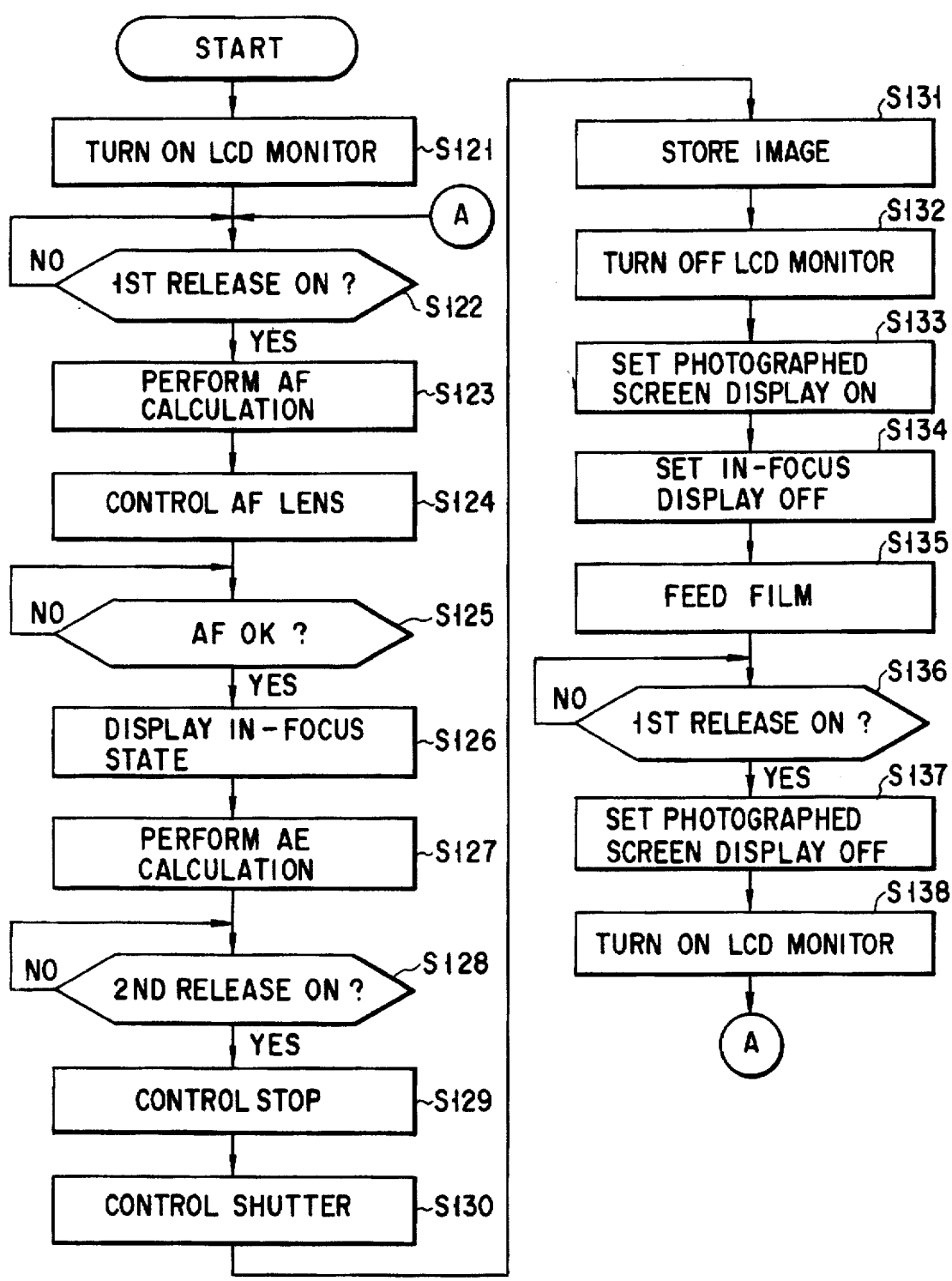
F I G. 15

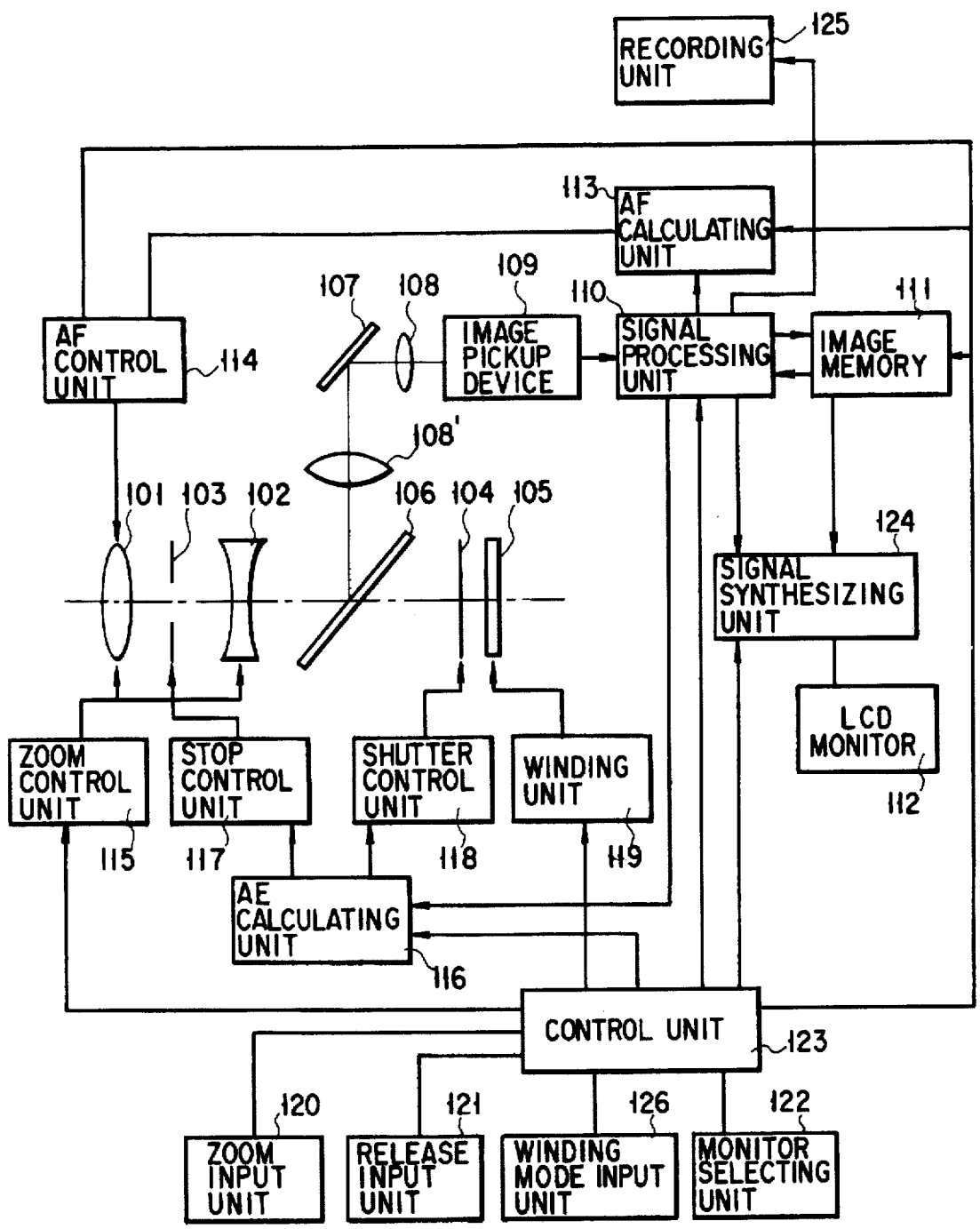
F I G. 17

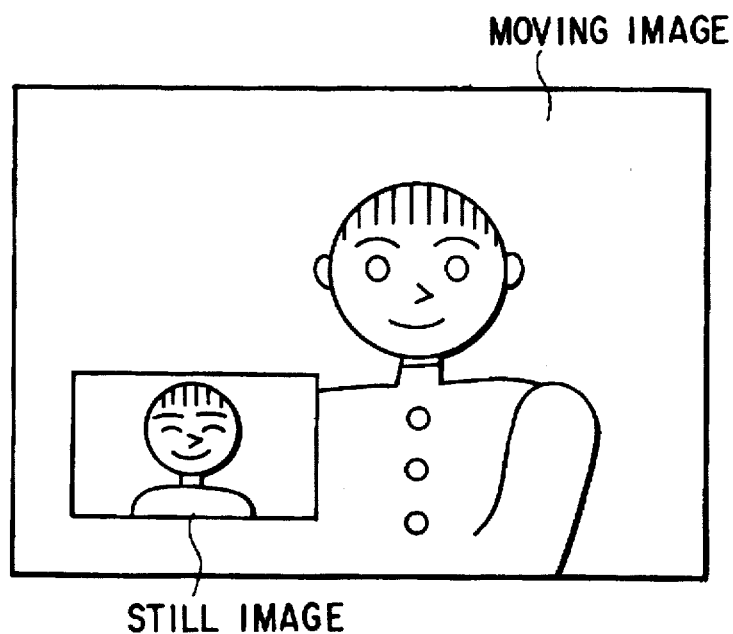
F I G. 19
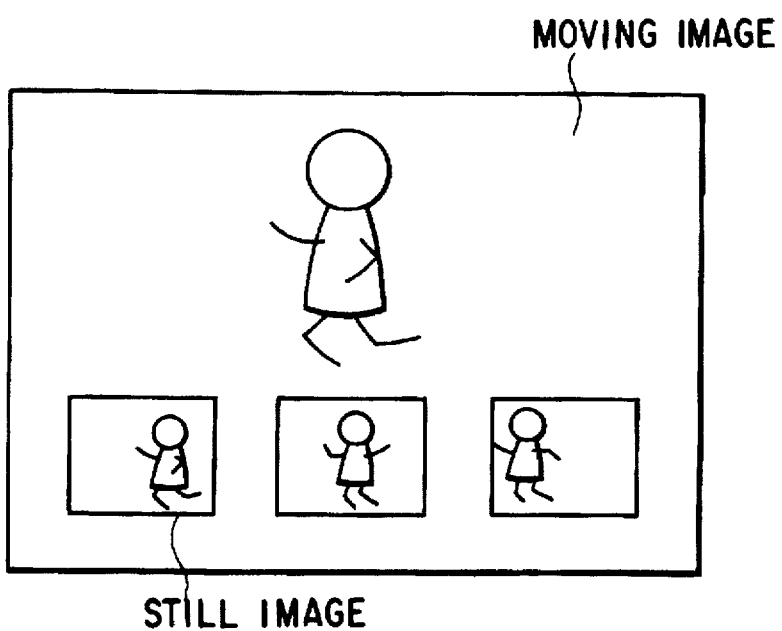
F I G. 20

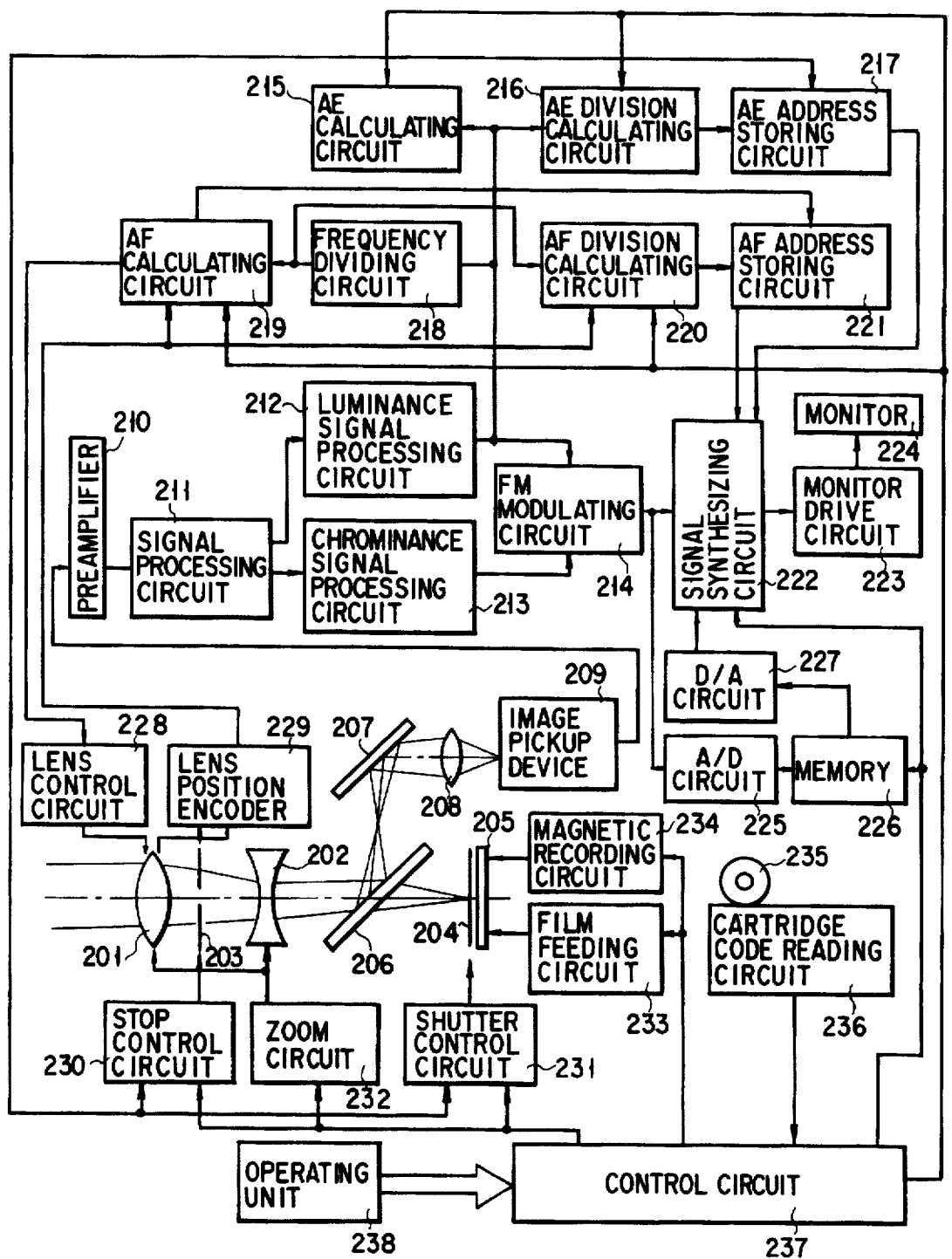
F I G. 25

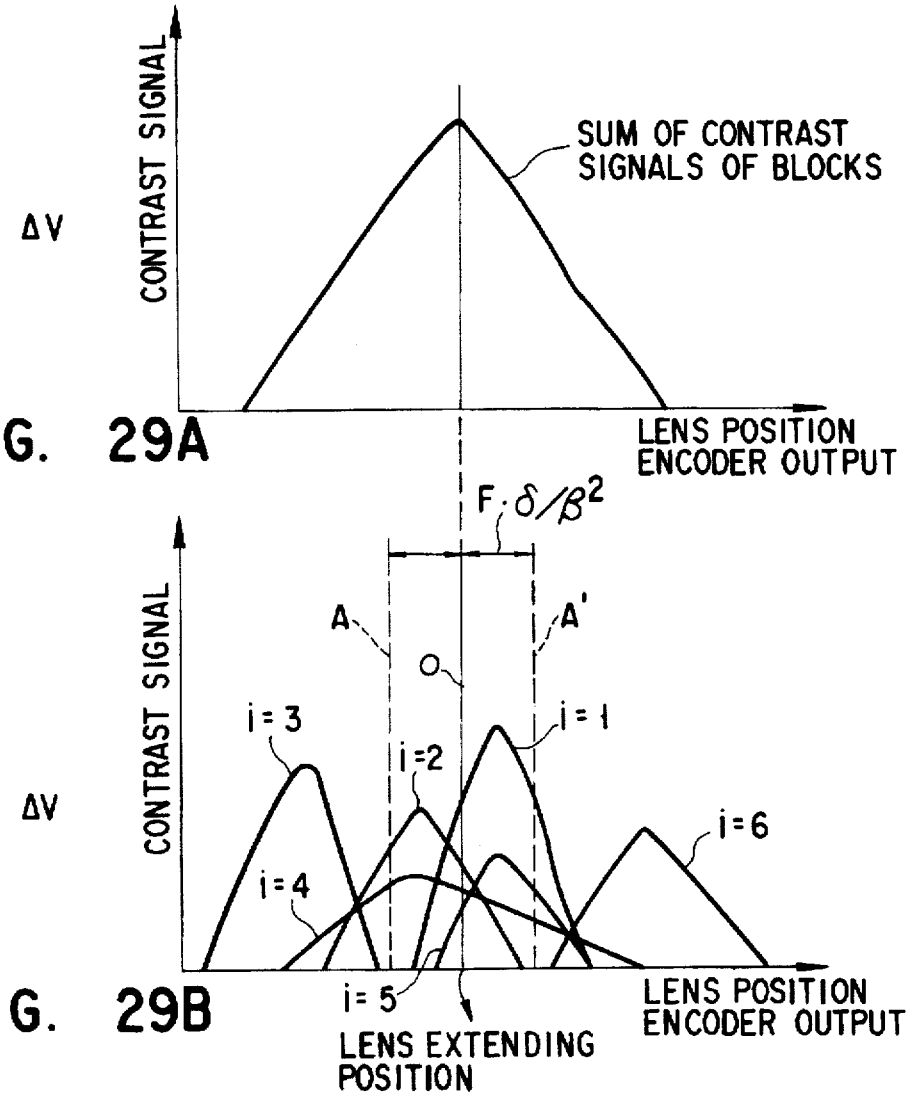

OUT-OF-DEPTH DISPLAY

IN-DEPTH DISPLAY

IN-DEPTH DISPLAY

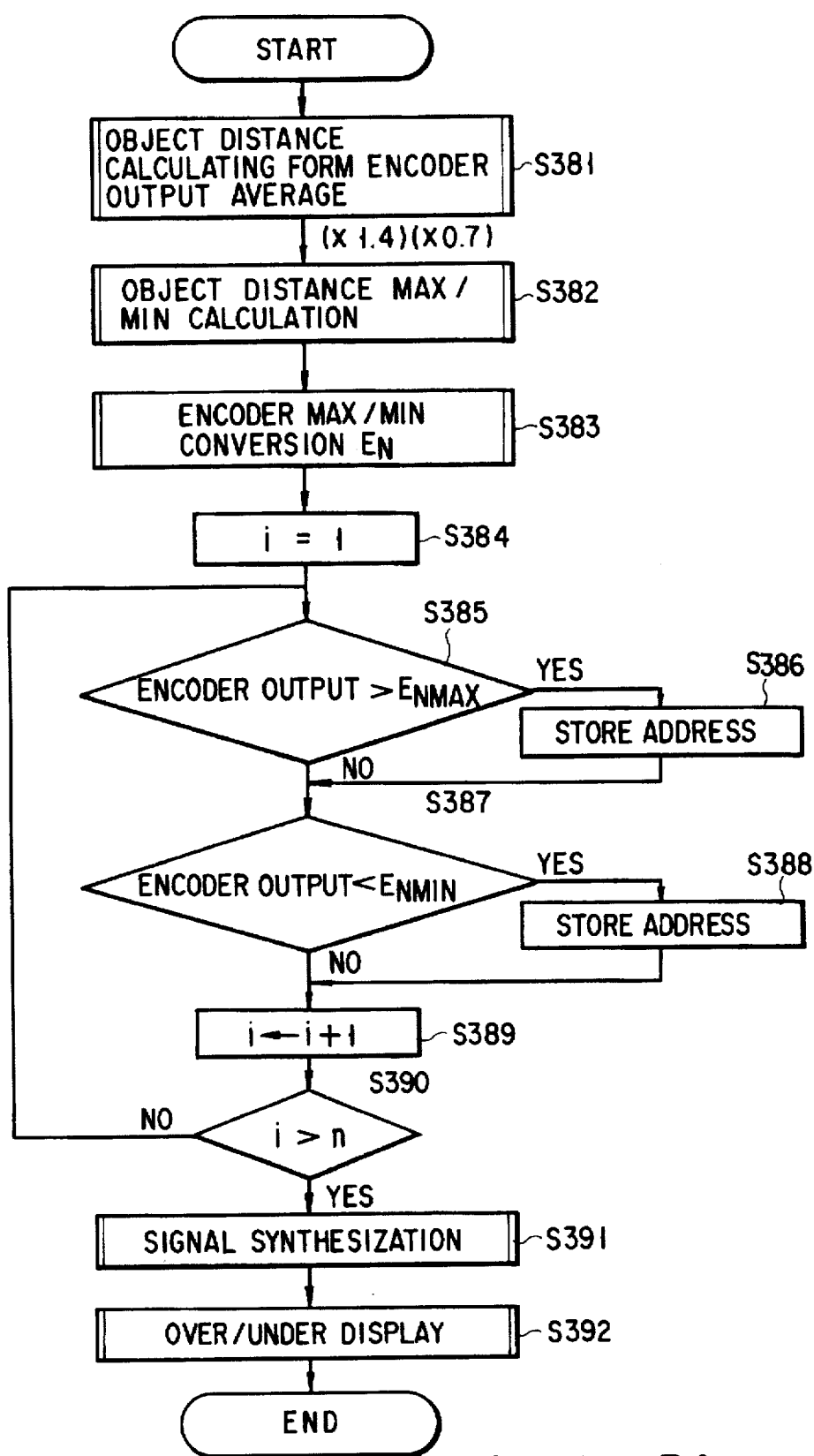
F I G. 34

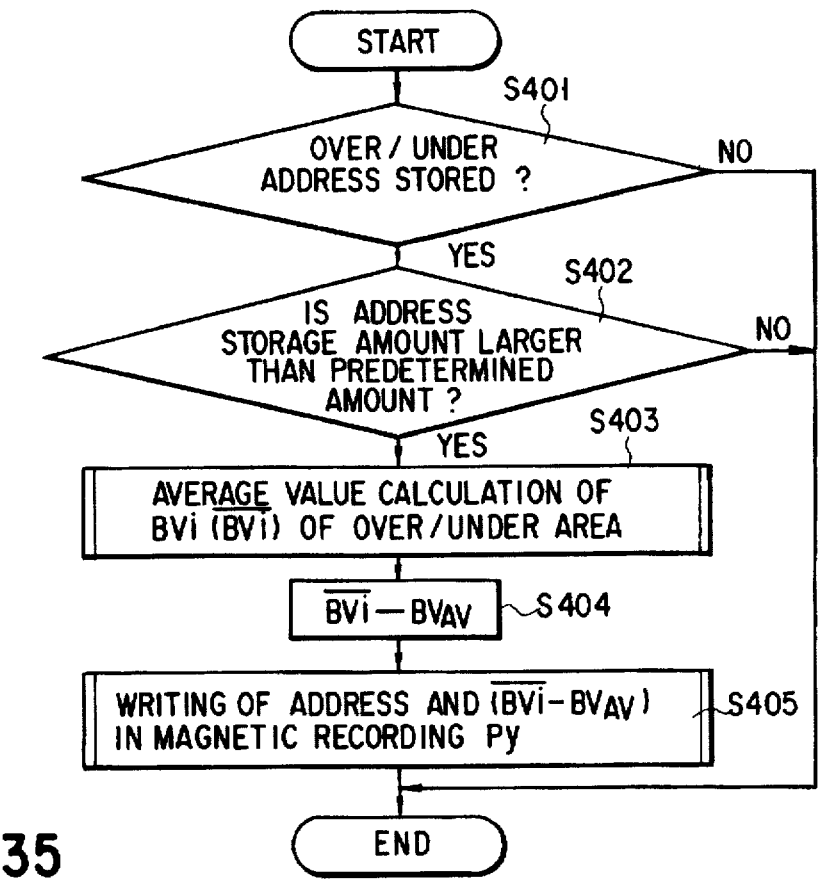
F I G. 35
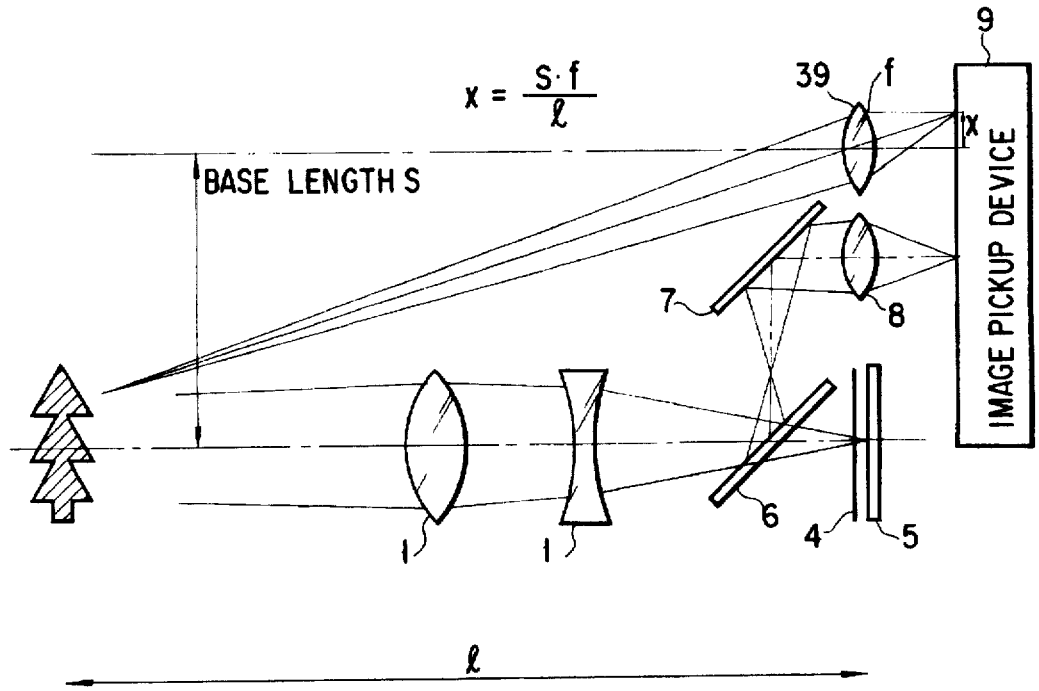
F I G. 37

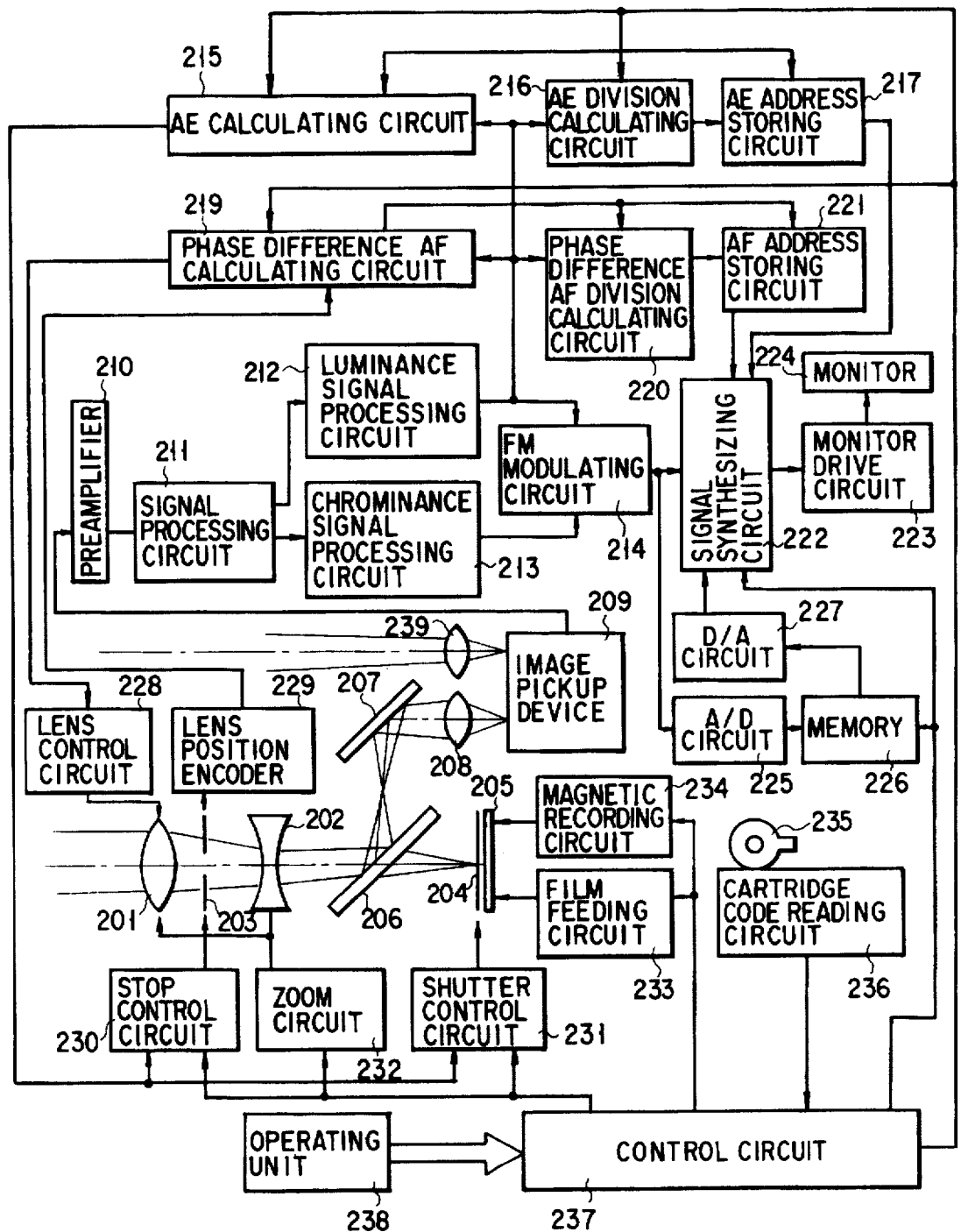
F I G. 36

CAMERA SYSTEM HAVING FUNCTION FOR PHOTOGRAPHING IMAGE LINKED TO ELECTRONIC IMAGE

This application is a Continuation of application Ser. No. 08/384,535, filed Feb. 8, 1995 now abandoned.

BACKGROUND OF THE INVENTION

1. Field of the Invention

The present invention relates to a camera system having a function for photographing, on a silver salt film, an image linked to an electronic image picked by an image pickup device.

The present invention also relates to a camera system having an electronic viewfinder using an image pickup device for confirming an object image.

The present invention further relates to a camera system using an image pickup device to confirm an object image and, more particularly, to a camera system having a properness/improperness display means for displaying conditions such as an AE (Automatic Exposure) condition and an AF (Automatic Focusing) condition.

2. Description of the Related Art

In recent years, a camera system in which a camera using a silver salt film can immediately confirm a photographed image by incorporating an electronic image pickup device in the camera has been proposed.

For example, in a single-lens reflex camera having a confirming function according to Jpn. Pat. Appln. KOKAI Publication No. 1-133038, there is disclosed a technique in which a half mirror splits light into two light components toward a finder optical system when a shutter is closed, and, when the shutter is open, the half mirror is pivoted, light is split into two light components toward an image pickup device and a photosensitive material, and an output from the image pickup device is stored, thereby immediately confirming an object image in photographing.

In a camera according to Jpn. UM Appln. KOKAI Publication No. 63-120241, there is disclosed a technique in which a half mirror is arranged to cross the optical axis of an optical lens, one of light transmitted through the half mirror and light reflected by the half mirror is guided on a silver salt film, and the other is guided to an electronic image pickup means, thereby immediately confirming an image itself formed on the silver salt film.

However, in the technique disclosed in Jpn. Pat. Appln. KOKAI Publication No. 1-133038, when the photographed object image is contrary to the purpose of a photographer, photographing must be performed again. Since the half mirror must be pivoted in photographing, a mechanism therefor is complex. A time-lag disadvantageously occurs in a time interval between when the shutter button is depressed and when the shutter is actually released.

In the technique disclosed in Jpn. UM Appln. KOKAI Publication No. 63-120241, although the photographed image itself can be immediately confirmed, image information correction such as exposure correction or view angle correction cannot be performed for the image. For this reason, when the photographed object image is contrary to the purpose of a photographer, photographing must be performed again.

In performing photographing using a conventional image pickup apparatus such as a camera, in order to align the composition of the current photographing with the composition of the preceding photographing, it is desired to confirm the screen of the preceding frame in next photographing.

For example, Jpn. Pat. Appln. KOKAI Publication No. 64-49031 discloses a technique in which, when a plurality of photographs are to be connected to each other to form one photograph, part of the screen of the preceding frame is displayed in an electronic viewfinder, and photographing can be performed to align the screen of the preceding frame with a screen to be photographed next.

However, in the technique disclosed in Jpn. Pat. Appln. KOKAI Publication No. 64-49031, since only the part of the screen of the preceding frame is displayed, the screen of the preceding frame can not be decided as a whole.

It is conventionally desirable that information related to the AE and AF of an object be displayed on an electronic viewfinder to show the information to a user. For example, Jpn. Pat. Appln. KOKAI Publication No. 63-260638 discloses a technique in which an edge signal of an area predicted to be defocused is decreased on the basis of object distance information and luminance information to show the area as an equivalently defocused image.

Jpn. Pat. Appln. KOKAI Publication No. 61-39009 discloses a technique in which, in an automatic tracking apparatus, a target mark is interlocked with a target which is automatically tracked.

However, in the technique disclosed in Jpn. Pat. Appln. KOKAI Publication No. 63-260638, since an image on an image pickup device is not defocused, the image is simulated and is not correct.

In the technique disclosed in Jpn. Pat. Appln. KOKAI Publication No. 61-39009, a focused target can be recognized, but a specific focusing range of a specific screen is unknown.

SUMMARY OF THE INVENTION

The present invention has been made in consideration of the above circumstances, and has as its object to provide a new and improved camera system capable of performing various systematic functions when and after an image linked to an electronic image is to be photographed.

The present invention has been made in consideration of one of the above problems, and has as another object to provide a camera system capable of immediately confirming a photographed object image and capable of performing correction of exposure and a view angle and trimming for the photographed object image, i.e., inputting correcting information.

The present invention has been made in consideration of the other problems, and has as still another object to provide a camera system capable of allowing a user to rapidly, correctly confirm information related to the AF and AE of an object on an electronic viewfinder.

The present invention has been made in consideration of one of the above problems, and has as still another object to provide a camera system capable of selectively displaying and confirming the states of all previously photographed screens in a display scheme desired by a photographer in next photographing.

According to the first aspect of the present invention, there is provided a camera system including a camera body for forming an object image on an image formation surface of a film and an electronic viewfinder coupled to the camera body and having an image pickup device for picking an image almost identical to the object image formed on the film surface, characterized by comprising:

information storing means for storing information from the image pickup device at a timing almost equal to a timing at which an image almost identical to an image displayed in the electronic viewfinder is exposed on the film;

read means for displaying the information stored in the information storing means on the viewfinder; and processing information inputting means for inputting processing information for printing on the basis of display information read out by the read means.

According to the second aspect of the present invention, there is provided a camera system characterized by comprising:

a first optical system for forming an object image on a silver salt film having an information recording medium;

an image pickup device for outputting an image signal for electrically recording the object image;

a second optical system for forming the object image on the image pickup device;

exposing means, interlocked with a photographing operation, for performing exposure on the silver salt film;

storing means, interlocked with the photographing operation, for storing the image signal from the image pickup device;

monitor means for reading the object image on the basis of the image signal stored in the storing means;

recording means for recording information on the information recording medium formed on the silver salt film; and control means for recording, on the information recording medium through the recording means, information used in processing the silver salt film.

According to the third aspect of the present invention, there is provided a camera having properness/improperness display means, exposure amount control means, focusing means, and an image pickup device, characterized by comprising:

monitor means for displaying an image corresponding to an output from the image pickup device;

calculating means for calculating at least one of exposure amount information and in-focus information on the basis of the output from the image pickup device; and display signal output means for outputting a signal for divisionally displaying properness/improperness of at least one of an exposure amount and an in-focus state for each area on the monitor means on the basis of an output from the calculating means.

According to the fourth aspect of the present invention, there is provided a camera having a photographic optical system for forming an object image on an image formation surface of a film and an electronic viewfinder having an image pickup device for picking an image almost identical to the image formed on the film surface, characterized by comprising;

exposure information storing means for storing information from the image pickup device at a timing almost equal to a timing at which an image almost identical to an image displayed in the electronic viewfinder is exposed on the film;

display means for performing, in a predetermined display form preset in a submonitor in the electronic viewfinder, a still image display for the information stored in the information storing means after the exposure information is stored; and submonitor display selecting means for selecting a display form displayed by the display means on the submonitor.

BRIEF DESCRIPTION OF THE DRAWINGS

FIG. 1 is a block diagram showing the arrangement of a camera system according to the first embodiment of the present invention;

FIG. 2 is a flow chart showing the operation of the camera system when post-processing is not performed in the first embodiment;

FIG. 6 is a view showing the post-processing information input from a post-processing information input unit 27;

FIG. 7 is a view of an example showing a state of a still image monitor in a case wherein the post-processing information is to be input;

FIG. 9 is a block diagram showing, as the second embodiment of the present invention, the arrangement of an editing apparatus which is loaded with a photographed film cartridge and a memory to input only post-processing information;

FIG. 11 is a block diagram showing the arrangement of a camera system according to the fourth embodiment of the present invention;

FIG. 12 is a block diagram showing the arrangement of a camera according to the fifth embodiment of the present invention;

FIG. 15 is a flow chart showing a sequence when a mode in which a photographed screen is kept displayed until a next release operation in a monitor selecting unit 122 of the camera of the fifth embodiment;

FIG. 17 is a block diagram showing the arrangement of a camera according to the sixth embodiment;

FIG. 19 is a view showing a state in which a small still image is displayed on a submonitor at the lower left portion on an LCD monitor 112;

FIG. 20 is a view showing the states of submonitor displays 1, 2, and 3 which display the still images of three frames;

FIG. 25 is a view showing the arrangement of a camera having a properness/improperness display means according to the seventh embodiment of the present invention;

FIG. 28 is a view showing a manner in which only an over/under area is colored and displayed on a monitor 224;

FIGS. 29A and 29B are graphs showing the relationship between a lens position encoder output and a contrast signal;

FIG. 34 is a flow chart showing a sequence for performing an AE over/under display in use of an electronic flash;

FIG. 35 is a flow chart showing the operation of a camera having a properness/improperness display means according to the eighth embodiment;

FIG. 36 is a view showing a camera having a properness/improperness display means according to the ninth embodiment; and FIG. 37 is a detailed view showing part of the optical system of the camera having the properness/improperness display means shown in FIG. 36.

DETAILED DESCRIPTION OF THE PREFERRED EMBODIMENTS

Figure 3A:
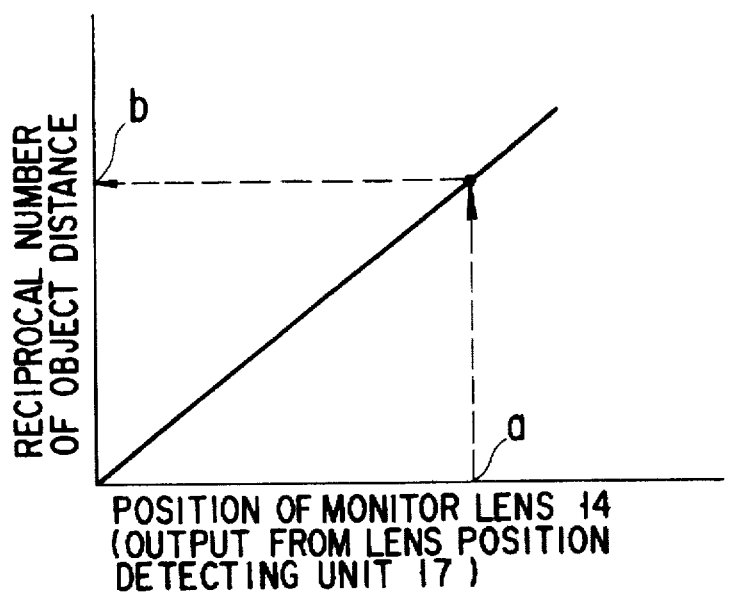
FIG. 3A is a graph showing the relationship between a single-focal-point lens 14 and the position of the reciprocal number of an object distance.

First of all, the first to fourth embodiments of the present invention will be described with reference to FIGS. 1 to 11.

FIG. 1 is a block diagram showing the arrangement of a camera system according to the first embodiment of the present invention.

Referring to FIG. 1, a convex lens 1 having a positive power and a concave lens 2 having a negative power constitute a 2-group zoom lens. Note that each of the convex lens 1 and the concave lens 2 is constituted by a plurality of lenses.

A stop/shutter 3 is constituted by two blades, and a shutter control unit 4 opens/closes the stop/shutter 3.

A focal length changing unit 5 changes the interval between the convex lens 1 and the concave lens 2 of the 2-group zoom lens to change a focal length. A focal length detecting unit 6 detects a focal length on the basis of the position of the concave lens 2.

A lens control unit 7 drives only the convex lens 1 to focus an image on the surface of a silver salt film 10, and a lens position detecting unit 8 detects the position of the convex lens 1 on the basis of the drive amount of the convex lens 1.

A cartridge 9 stores the silver salt film 10, and a film feeding unit 11 winds or rewinds the silver salt film 10. A film moving amount detecting unit 12 detects the moving amount of the silver salt film 10.

While the film is fed, a magnetic recording circuit 13 supplies recording information to a magnetic head 13a for recording information on a magnetic recording layer coated on the silver salt film 10 except for a photographing area.

A single-focal-point lens 14 for an image pickup device 15 is arranged independently of the convex lens 1 and the concave lens 2 constituting a photographic lens. The image pickup device 15 is constituted by a CCD (Charge Coupled Device) for transferring charges stored in photodiodes having several hundred thousands of pixels. Note that the image pickup device 15 is not limited to the CCD, and a device, e.g., a MOS image pickup device, having a function equivalent to that of the CCD may be used as the image pickup device 15.

A lens control unit 16 drives and controls the single-focal-point lens 14 to focus an image on the image pickup device 15, and a lens position detecting unit 17 detects the position of the single-focal-point lens 14.

A signal processing circuit 18 processes an image signal of the object image output from the image pickup device 15, and a still image signal of the object image processed by the signal processing circuit 18 is stored in a memory 19.

A read circuit 20 reads an object image signal from the signal processing circuit 18 to display an object image incident on the image pickup device 15 on an image monitor 21 in real time. The read circuit 20 also reads out, on the image monitor 21, the object image signal stored in the memory 19.

The image monitor 21 actually displays a signal output from the read circuit 20 on a screen.

A distance measurement range selecting circuit 22 uses necessary part of information of all the pixels processed by the signal processing circuit 18 to check whether the object image on the image pickup device 15 is in a near-focus state or in a far-focus state and to calculate a direction in which the object image is offset and a distance by which the object image is offset, and the distance measurement range selecting circuit 22 outputs a detection signal to the lens control unit 16.

A photometric range selecting circuit 23 uses necessary part of the information of all the pixels to output an illuminance on the image pickup device 15 to an exposure calculating circuit 25.

A film information detecting unit 24 detects information representing the film sensitivity of the silver salt film 10 or the like, and outputs the information to the exposure calculating circuit 25.

On the basis of the information from the photometric range selecting circuit 23 or the film information detecting unit 24, the exposure calculating circuit 25 calculates an exposure amount applied to the silver salt film 10 and outputs the result to the shutter control unit 4.

An AF (Automatic Focusing)/AE (automatic Exposure) mode input unit 26 outputs, to a control circuit 30, an instruction for determining the distant measurement range output from the distance measurement range selecting circuit 22 or the photometric range output from the photometric range selecting circuit 23.

A post-processing information input unit 27 outputs correcting information such as exposure correcting information or color correcting information to the control circuit 30 upon completion of photographing for the silver salt film 10.

In order to inform a user of specific information input during post-processing for inputting the correcting information such as the exposure correcting information or the color correcting information, a superimposing information output circuit 28 outputs, through the read circuit 20, superimposing information for overlappingly displaying the correcting information on an object image monitor on the image monitor 21.

When a mode in which the post-processing is not performed is set, a monitor time setting unit 29 determines a period of time for which the object image is displayed upon completion of photographing, and the monitor time setting unit 29 outputs a determination signal to the control circuit 30. On the other hand, when a mode in which the post-processing is performed is set, the monitor time setting unit 29 outputs the determination signal to the control circuit 30 such that the photographed object image is kept displayed until the post-processing is completed.

A magnetic reading circuit 31 reads information recorded on the magnetic recording layer of the silver salt film 10.

Note that the control circuit 30 controls the operation of the entire camera system.

The operation of the camera system having the above arrangement according to the present invention will be described below.

FIG. 2 is a flow chart showing the operation of the camera system when the post-processing is not performed in the first embodiment.

Unlike the operation of a conventional camera, a user uses the image monitor 21 in place of an optical finder to confirm an object image (step S1).

The object image on the image pickup device 15 is photoelectrically converted and sent to the signal processing circuit 18.

Of output signals from the signal processing circuit 18, an output difference between a signal having only a predetermined range selected by the distance measurement range selecting circuit 22 and a signal of an adjacent pixel is detected to form a contrast signal. The single-focal-point lens 14 is driven through the lens control unit 16 on the basis of the magnitude of the contrast signal.

In this case, when the contrast becomes high, i.e., the object image is focused on the image pickup device 15, the single-focal-point lens 14 is stopped.

Although the convex lens 1 and the concave lens 2 constituting the photographic lens operate as a zoom lens, the single-focal-point lens 14 serving as a monitor lens is a single-focal-point lens. For this reason, the photographic range of the convex lens 1 and the concave lens 2 constituting the photographic lens must be indicated with respect to the contents displayed on the image monitor 21.

The view angle of the single-focal-point lens 14 is set to be slightly wider than a view angle of the convex lens 1 and the concave lens 2 in a wide-angle mode.

The signal processing circuit 18 outputs a signal corresponding to the view angle of the convex lens 1 and the concave lens 2 constituting the photographic lens on the basis of an output from the focal length detecting unit 6 for the convex lens 1 and the convex lens 1 and the concave lens 2 constituting the photographic lens. For this reason, this signal allows the image monitor 21 to display the object image of a portion corresponding to the view angle of the convex lens 1 and the concave lens 2 constituting the photographic lens.

Note that this display is performed by a series of processes of the signal processing circuit 18, the read circuit 20, and the image monitor 21.

Therefore, the image monitor 21 can monitor the motion of the object in real time. Even if the object distance changes, the object image is always focused because the single-focal-point lens 14 is driven by a series of processes of the image pickup device 15, the signal processing circuit 18, the distance measurement range selecting circuit 22, and the lens control unit 16.

When the user uses the focal length changing unit 5 to change the focal length of the convex lens 1 and the concave lens 2 constituting the photographic lens, an output from the focal length detecting unit 6 changes, and the range of the object image signal output from the signal processing circuit 18 changes. For this reason, on the image monitor 21, it seems as if the single-focal-point lens 14 serving as a monitor lens is zoomed (step S2).

It is detected whether a second release (2nd release) button is depressed. If the second release (2nd release) button is depressed, the flow advances to step S4. If the second release (2nd release) button is not depressed, the detection to determine whether the second release (2nd release) button is depressed is repeated until the second release (2nd release) button is depressed (step S3).

If the second release (2nd release) button is depressed, a photographing operation is started, and the position of the single-focal-point lens 14 serving as a monitor lens is detected by the lens position detecting unit 17.

The reciprocal number of the object distance can be recognized on the basis of an output from the lens position detecting unit 17, and a necessary extension amount of the convex lens 1 can be calculated on the basis of an output from the focal length detecting unit 6. For this reason, the lens control unit 7 extends the convex lens 1 to a predetermined position while monitoring an output from the lens position detecting unit 8 (step S4).

Figure 3B:
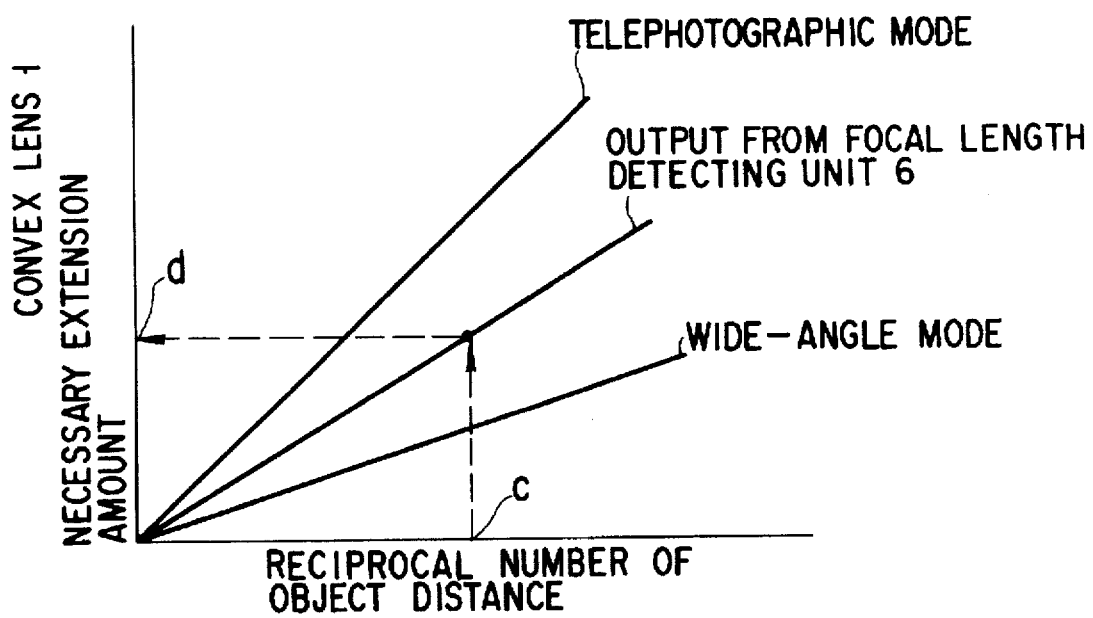
FIG. 3B is a graph showing the relationship between the reciprocal number of an object distance and a required extension amount of a convex lens 1.

FIG. 3A is a graph showing the relationship between the single-focal-point lens 14 and the position of the reciprocal number of the object distance, and FIG. 3B is a graph showing the reciprocal number of the object distance and the necessary extension amount of the convex lens 1.

The exposure calculating circuit 25 receives the film sensitivity information detected by the film information detecting unit 24. Luminance signals of the pixels are output from the signal processing circuit 18 to the photometric range selecting circuit 23 in accordance with outputs from the image pickup device 15, and the photometric range selecting circuit 23 causes the exposure calculating circuit 25 to receive an average value based on the luminance signals of a necessary area.

In this manner, the exposure calculating circuit 25 calculates a time value of the shutter and informs the shutter control unit 4 of the time value.

When the control circuit 30 outputs an operation start signal to the shutter control unit 4, the shutter 3 is open for a predetermined period of time (step S5).

At the same time, the control circuit 30 also sends the signal to the memory 19, the object image on the image pickup device 15 at a timing equal to a timing at which the silver salt film 10 is exposed is integrated for a period of time equal to the time value of the shutter 3, and the resultant value is stored in the memory 19.

The image monitor 21 has monitored the object image in real time so far, i.e., a moving image has been displayed on the image monitor 21 so far. However, upon completion of photographing, the object image stored in the memory, i.e., a still image, is displayed on the image monitor 21 for a predetermined period of time (step S6).

The period of time for which the still image is displayed on the image monitor 21 can be arbitrarily set by the monitor time setting unit.

However, if the next photographing is performed within the predetermined period of time, the still image on the image monitor 21 is replaced with the monitor of a moving image obtained by the latest photographing.

After photographing, the film feeding unit 11 winds the silver salt film 10 by only one frame while monitoring an output from the film moving amount detecting unit 12 (step S7).

While the film is fed, the magnetic recording circuit 13 records, on a magnetic recording layer of the silver salt film 10, a signal representing no post-processing and a signal related to time and date of photography, and a photographed frame (step S8). Thereafter, the operation of the camera system is ended.

Figure 4:
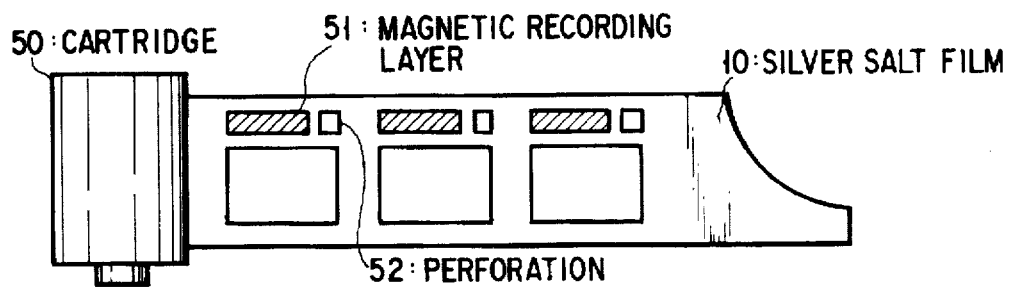
FIG. 4 is a view showing a silver salt film 10 stored in a cartridge.

FIG. 4 is a view illustrating the silver salt film 10 stored in a cartridge.

Referring to FIG. 4, the silver salt film 10 is stored in a cartridge 50, and the magnetic recording layers 51 and perforations 52 are formed on and in one side of the edge portions of the silver salt film 10.

The operation of the camera system in a case wherein the post-processing is performed immediately after a 1-frame photographing operation is performed will be described below.

Figure 5:
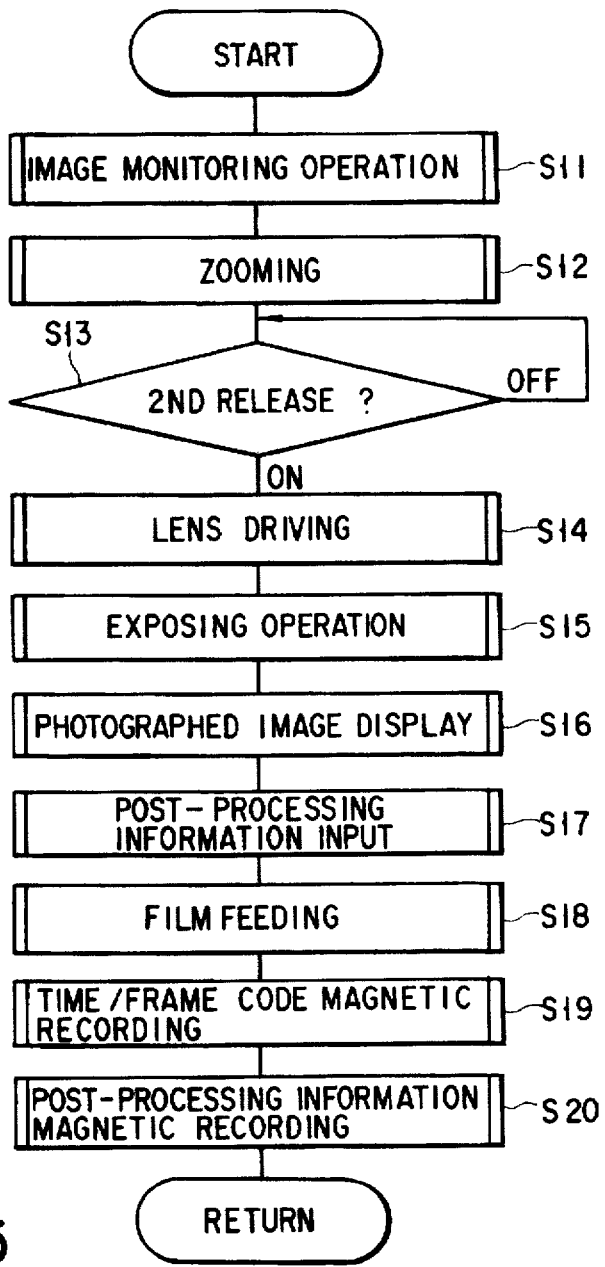
FIG. 5 is a flow chart showing the operation of the camera system when post-processing is performed immediately after one-frame photographing is performed.

FIG. 5 is a flow chart showing the operation of the camera system when the post-processing is performed immediately after 1-frame photographing is performed.

In this case, when the post-processing information input unit 27 is in an ON state before photographing, or when the post-processing information input unit 27 is turned on while a still image obtained after the photographing is monitored, the post-processing can be performed.

The same processes as those in the case wherein no post-processing is performed until the silver salt film 10 is exposed and a still image obtained at this time is monitored on the image monitor 21.

Unlike the operation of a conventional camera, a user uses the image monitor 21 in place of an optical finder to confirm an object image (step S11).

In this case, when a post-processing mode is set before a photographing operation, the film is not wound.

When the post-processing mode is set after the photographing, the film has already been wound by one frame. For this reason, the film is rewound by one frame.

The object image on the image pickup device 15 is photoelectrically converted and sent to the signal processing circuit 18.

Of output signals from the signal processing circuit 18, an output difference between a signal having only a predetermined range selected by the distance measurement range selecting circuit 22 and a signal of an adjacent pixel is detected to form a contrast signal. The single-focal-point lens 14 is driven through the lens control unit 16 on the basis of the magnitude of the contrast signal.

In this case, when the contrast becomes high, i.e., the object image is focused on the image pickup device 15, the single-focal-point lens 14 is stopped.

Although the convex lens 1 and the concave lens 2 constituting the photographic lens operate as a zoom lens, the single-focal-point lens 14 serving as a monitor lens is a single-focal-point lens. For this reason, the photographic range of the convex lens 1 and the concave lens 2 constituting a photographic lens must be indicated with respect to the contents displayed on the image monitor 21.

The view angle of the single-focal-point lens 14 is set to be slightly wider than a view angle of the convex lens 1 and the concave lens 2 in a wide-angle mode.

The signal processing circuit 18 outputs a signal corresponding to the view angle of the convex lens 1 and the concave lens 2 constituting the photographic lens on the basis of an output from the focal length detecting unit 6 for the convex lens 1 and the convex lens 1 and the concave lens 2 constituting the photographic lens. For this reason, this signal allows the image monitor 21 to display the object image of a portion corresponding to the view angle of the convex lens 1 and the concave lens 2 constituting the photographic lens.

Note that this display is performed by a series of processes of the signal processing circuit 18, the read circuit 20, and the image monitor 21.

Therefore, the image monitor 21 can monitor the motion of the object in real time. Even if the object distance changes, the object image is always focused because the single-focal-point lens 14 is driven by a series of processes of the image pickup device 15, the signal processing circuit 18, the distance measurement range selecting circuit 22, and the lens control unit 16.

When the user uses the focal length changing unit 5 to change the focal length of the convex lens 1 and the concave lens 2 constituting the photographic lens, an output from the focal length detecting unit 6 changes, and the range of the object image signal output from the signal processing circuit 18 changes. For this reason, on the image monitor 21, it seems as if the single-focal-point lens 14 serving as a monitor lens is zoomed (step S12).

It is detected whether a second release (2nd release) button is depressed. If the second release (2nd release) button is depressed, the flow advances to step S14. If the second release (2nd release) button is not depressed, the detection to determine whether the second release (2nd release) button is depressed is repeated until the second release (2nd release) button is depressed (step S13).

If the second release (2nd release) button is depressed, a photographing operation is started, and the position of the single-focal-point lens 14 serving as a monitor lens is detected by the lens position detecting unit 17.

The reciprocal number of the object distance can be recognized on the basis of an output from the lens position detecting unit 17, and a necessary extension amount of the convex lens 1 can be calculated on the basis of an output from the focal length detecting unit 6. For this reason, the lens control unit 7 extends the convex lens 1 to a predetermined position while monitoring an output from the lens position detecting unit 8 (step S14).

The exposure calculating circuit 25 receives the film sensitivity information detected by the film information detecting unit 24. Luminance signals of the pixels are output from the signal processing circuit 18 to the photometric range selecting circuit 23 in accordance with outputs from the image pickup device 15, and the photometric range selecting circuit 23 causes the exposure calculating circuit 25 to receive an average value based on the luminance signals of a necessary area.

In this manner, the exposure calculating circuit 25 calculates a time value of the shutter and informs the shutter control unit 4 of the time value.

When the control circuit 30 outputs an operation start signal to the shutter control unit 4, the shutter 3 is open for a predetermined period of time (step S15).

At the same time, the control circuit 30 also sends the signal to the memory 19, the object image on the image pickup device 15 at a timing equal to a timing at which the silver salt film 10 is exposed is integrated for a period of time equal to the time value of the shutter 3, and the resultant value is stored in the memory 19.

The image monitor 21 has monitored the object image in real time so far, i.e., a moving image has been displayed on the image monitor 21 so far. However, after the photographing operation, the object image stored in the memory, i.e., a still image, is displayed on the image monitor 21 (step S16).

The post-processing information is input and determined while the image monitor 21 shown in FIG. 7 (to be described later) is monitored (step S17).

When the input of the post-processing information is completed, the silver salt film 10 is wound by one frame (step S18).

While the film is fed, the magnetic recording circuit 13 records, on a magnetic recording layer of the silver salt film 10, a signal related to time and date of photography, and a photographed frame (step S19), and the post-processing information is recorded on the magnetic recording layer on the silver salt film 10 (step S20). Thereafter, the operation of the camera system is ended.

FIG. 6 is a view showing the post-processing information input from the post-processing information input unit 27, and FIG. 7 is a view of an example showing a state of the still image monitor in a case wherein the post-processing information is input.

The post processing information will be described below.

Exposure correcting information is input when it is decided according to the conditions on the monitor that the brightness/darkness of an entire photograph is to be corrected in a printing operation. For example, when an entire photograph is to be made brighter, the exposure correcting information makes an instruction for performing a printing operation at +1.0 EV.

The exposure correcting information may be input such that a specific area, e.g., only the portion of a person's face photographed with back light, is corrected.

Color correcting information makes an instruction to emphasize a specific color when tonality imaged by a user is not obtained.

View angle correcting information designates only a view angle when a trimming process is performed in a printing operation.

For example, although photographing is performed in a wide-angle mode, it seems that the photographing is to be performed with a focal length slightly larger than the set focal length. In this case, when a desired focal length is input, a monitor obtained such that the monitor having the focal length used in the actual photographing is corrected by the input focal distance is displayed on the image monitor 21.

According to trimming information, when a specific area on the monitor is designated, only the portion of the area is displayed on the entire area of the image monitor 21, or only the area is displayed on an entire print in a printing operation.

When aspect ratio information is input when a mode is switched to a panorama mode after photographing, a print range is shown on the monitor as indicated by a wavy line in FIG. 7 (to be described later).

A print count is information used for printing a designated number of photographs and giving the printed photographs to a user.

Date information indicates specific data which is selected from "year", "month", "day", "hour", and "minute" and is to be printed in a printing operation.

Photo CD forming information indicates whether data related to the frames of the film are also recorded on a photo CD when a photographed film is requested for processing to a processing laboratory.

After these pieces of information are input, when a signal indicating that the post-processing is completed is input, film feeding is started. In addition to the information obtained when the post-processing is not performed, the post-processing information is recorded on the magnetic recording layer.

In a processing laboratory, prints are formed on the basis of the post-processing information recorded on each frame.

The post-processing performed after the photographing has been described above. Post-processing performed after one film is completely photographed and the film is completely rewound will be described below.

Figure 8:
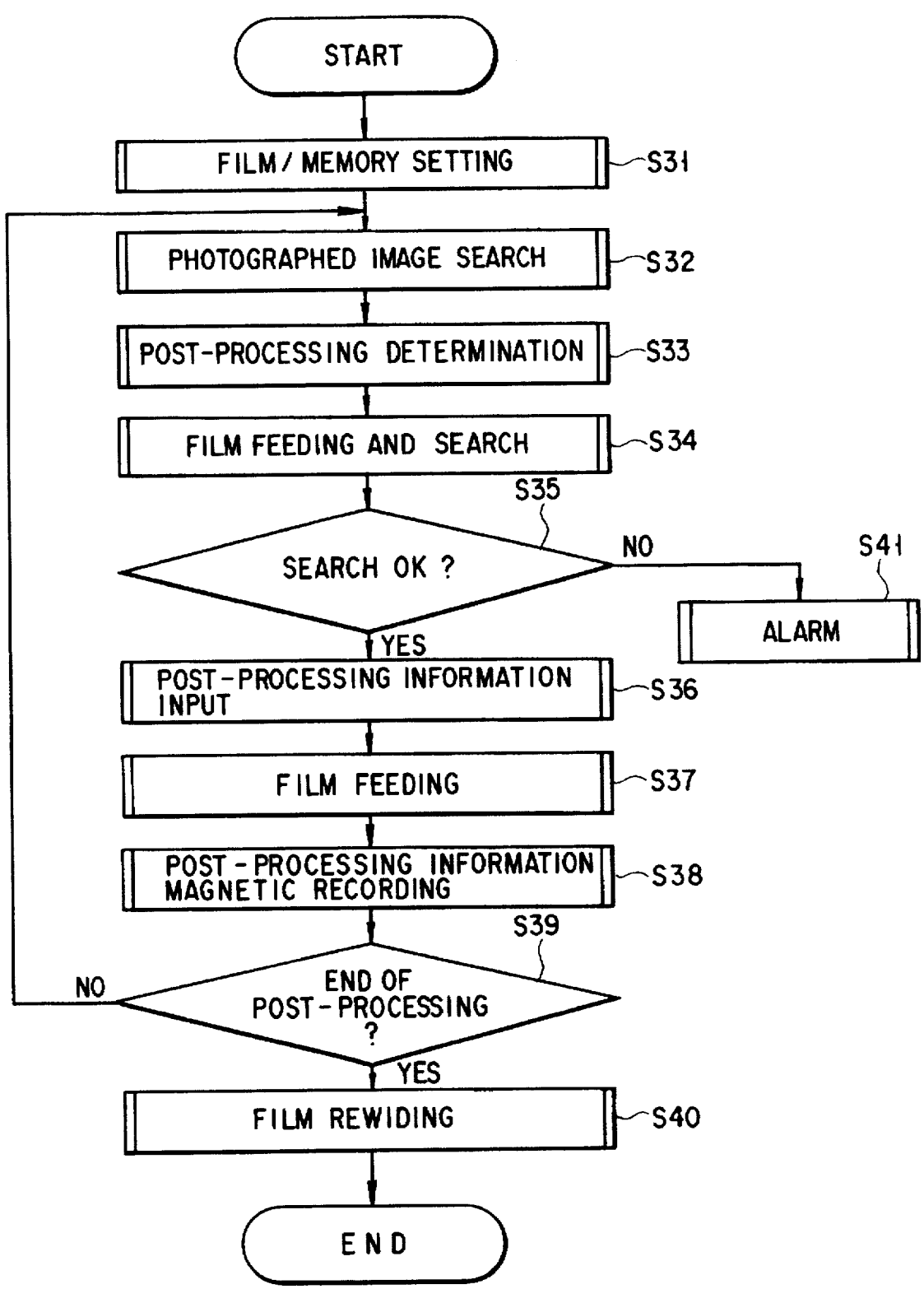
FIG. 8 is a flow chart showing the post-processing performed after one film is completely photographed and the film is completely rewound.

FIG. 8 is a flow chart showing the post-processing performed after one film is completely photographed and the film is completely rewound.

In this case, the memory 19 can be detachably arranged, and the photographed film and the memory 19 used in this photographing are set in a camera (step S31).

A screen subjected to the post-processing is searched and found on the image monitor 21 (step S32).

When the screen subjected to the post-processing is found (step S33), and information indicating that the post-processing is in an ON state is input from the post-processing information input unit 27, film feeding is started.

The magnetic reading circuit 31 finds a frame having the same frame number as that of the monitor read on the image monitor 21 while searching the information of the magnetic recording layer. When the predetermined frame is found, film feeding is stopped (step S34).

The time and date of photography of the frame in the memory 19 is compared with those on the magnetic recording layer on the silver salt film 10 (step S35). If NO in step S35, an alarm is generated because information on the silver salt film 10 does not coincide with that in the memory 19 (step S41). If YES in step S35, the search is OK, and the flow advances to step S36.

In this case, the post-processing information is input and determined while the image monitor 21 shown in FIG. 7 is monitored (step S36).

Upon completion of the input of the post-processing information, while the film is wound by one frame (step S37), the post-processing information is recorded again on the magnetic recording layer on the silver salt film 10 (step S38).

Subsequently, when the post-processing is to be performed, the flow returns to step S32. When the post-processing is not to be performed, the flow advances to step S40 (step S39).

In step S40, film rewinding is performed, and the operation is completed.

FIG. 9 is a block diagram showing, as the second embodiment of the present invention, the arrangement of an editing apparatus which is loaded with a photographed film cartridge and a memory to input only post-processing information.

Referring to FIG. 9, a cartridge 9 stores the silver salt film 10, a film feeding unit 11 winds/rewinds the silver salt film 10, and a film moving amount detecting unit 12 detects the moving amount of the silver salt film 10.

A magnetic recording circuit 13 supplies recording information to a magnetic head 13a for recording information on a magnetic recording layer coated on the silver salt film 10 except for a photographic screen. A magnetic reading circuit 31 reads the information recorded on the magnetic recording layer of the silver salt film 10 and outputs the information to a control circuit 30.

A memory 19 stores, through the control circuit 30, the information read by the magnetic reading circuit 31, and a read circuit 20 reads out, on an image monitor 21, an object image signal which is the information stored in the memory 19.

A post-processing information input unit 27 outputs correcting information such as exposure correcting information or color correcting information to the control circuit 30. In order to inform a user of information input during post-processing for inputting the correcting information such as the exposure correcting information or the color correcting information, a superimposing information output circuit 28 outputs, through the read circuit 20, superimposing information for overlappingly displaying the correcting information on an object image monitor on the image monitor 21.

Note that the control circuit 30 controls the operation of the entire editing apparatus.

The operation of the editing apparatus will be described below with reference to the flow chart shown in FIG. 8.

In this case, the memory 19 is detachably arranged, and the photographed film and the memory 19 used in this photographing are set in the editing apparatus (step S31).

A screen subjected to the post-processing is searched and found on the image monitor 21 (step S32).

When the screen subjected to the post-processing is found (step S33), and information indicating that the post-processing is in an ON state is input from the post-processing information input unit 27, film feeding is started.

The magnetic reading circuit 31 finds a frame having the same frame number as that of the monitor read on the image monitor 21 while searching the information of the magnetic recording layer. When the predetermined frame is found, film feeding is stopped (step S34).

The time and date of photography of the frame in the memory 19 is compared with those on the magnetic recording layer on the silver salt film 10 (step S35). If NO in step S35, an alarm is generated because information on the silver salt film 10 does not coincide with that in the memory 19 (step S41). If YES in step S35, the search is OK, and the flow advances to step S36.

In this case, the post-processing information is input and determined while the image monitor 21 shown in FIG. 7 is monitored (step S36).

Upon completion of the input of the post-processing information, while the film is rewound by one frame (step S37), the post-processing information is recorded again on the magnetic recording layer on the silver salt film 10 (step S38).

Subsequently, when the post-processing is to be performed, the flow returns to step S32. When the post-processing is not to be performed, the flow advances to step S40 (step S39).

In step S40, film rewinding is performed, and the operation is completed.

Since the image monitor 21 larger than the monitor incorporated in the camera is arranged, details can be confirmed.

Figure 10:
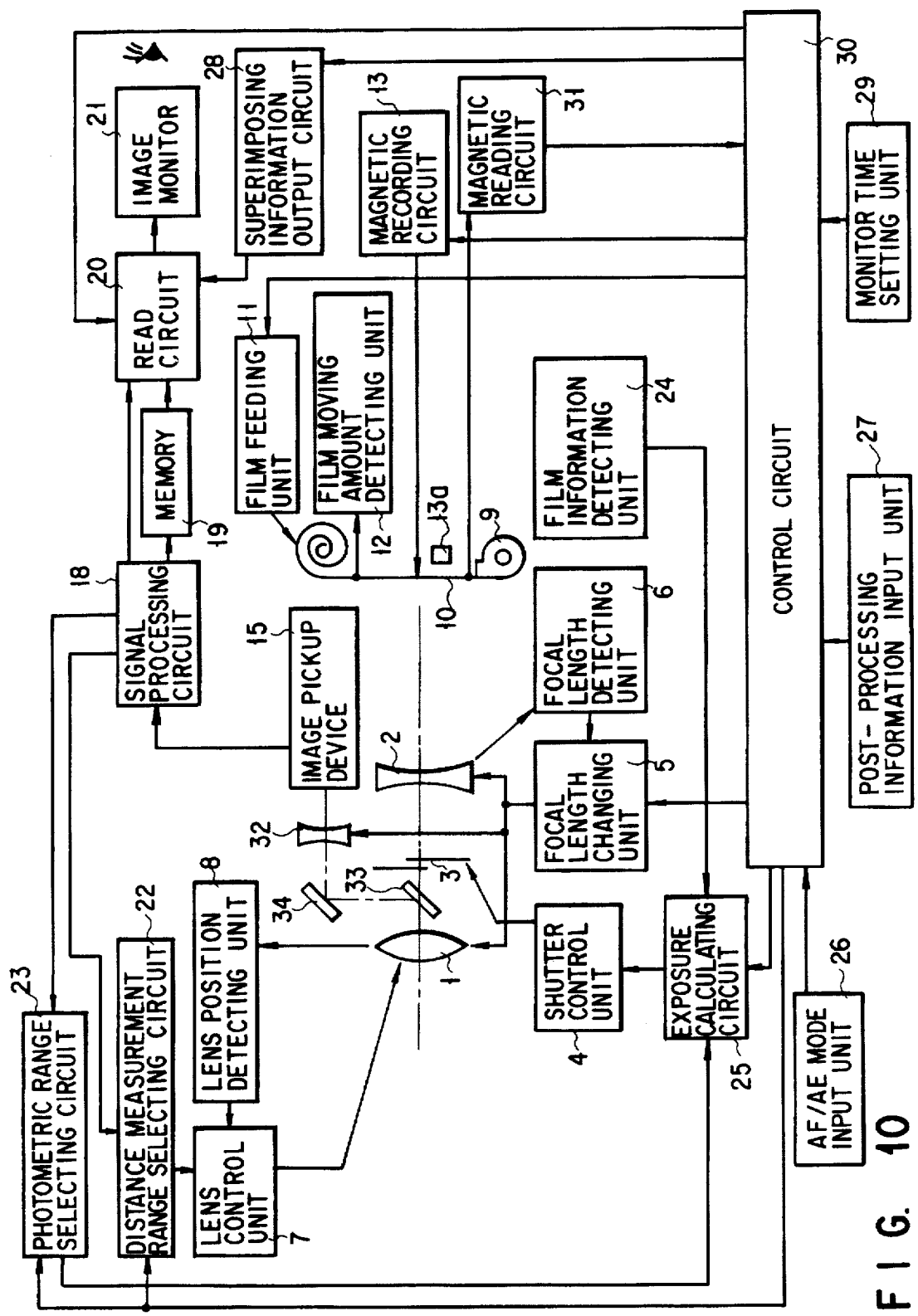
FIG. 10 is a block diagram showing the arrangement of a camera system according to the third embodiment of the present invention.

FIG. 10 is a block diagram showing the arrangement of a camera system according to the third embodiment of the present invention.

Referring to FIG. 10, a convex lens 1 having a positive power and a concave lens 2 having a negative power constitute a 2-group zoom lens. Note that each of the convex lens 1 and the concave lens 2 is constituted by a plurality of lenses.

A stop/shutter 3 is constituted by two blades, and a shutter control unit 4 opens/closes the stop/shutter 3.

A focal length changing unit 5 changes the interval between the convex lens 1 and the concave lens 2 of the 2-group zoom lens to change a focal length. A focal length detecting unit 6 detects a focal length on the basis of the interval in the 2-group zoom lens.

A lens control unit 7 drives only the convex lens 1 to focus an image on the surface of a silver salt film 10, and a lens position detecting unit 8 detects the position of the convex lens 1 on the basis of the drive amount of the convex lens 1.

A cartridge 9 stores the silver salt film 10, and a film feeding unit 11 winds or rewinds the silver salt film 10. A film moving amount detecting unit 12 detects the moving amount of the silver salt film 10.

During film feeding, a magnetic recording circuit 13 supplies recording information to a magnetic head 13a for recording information on a magnetic recording layer coated on the silver salt film 10 except for a photographic screen.

A beam from an object image passes through the convex lens 1, is reflected by a half mirror 33, is reflected by a mirror 34, and then passes through a concave zoom lens 32 to form the object image on the image pickup device 15. The image pickup device 15 is constituted by a CCD for transferring charges stored in photodiodes having several hundred thousands of pixels. Note that the image pickup device 15 is not limited to the CCD, and a device, e.g., a MOS image pickup device, having a function equivalent to that of the CCD may be used as the image pickup device 15.

A signal processing circuit 18 processes an image signal of the object image output from the image pickup device 15, and a still image signal of the object image processed by the signal processing circuit 18 is stored in a memory 19.

A read circuit 20 reads an object image signal from the signal processing circuit 18 to display an object image incident on the image pickup device 15 on an image monitor 21 in real time. The read circuit 20 also reads out, on the image monitor 21, the object image signal stored in the memory 19.

The image monitor 21 actually displays a signal output from the read circuit 20 on a screen.

A distance measurement range selecting circuit 22 uses necessary part of information of all the pixels processed by the signal processing circuit 18 to check whether the object image on the image pickup device 15 is in a near-focus state or in a far-focus state and to also calculate a direction in which the object image is offset and a distance by which the object image is offset, and the distance measurement range selecting circuit 22 outputs a detection signal to the lens control unit 16.

A photometric range selecting circuit 23 uses necessary part of the information of all the pixels to output an illuminance on the image pickup device 15 to an exposure calculating circuit 25.

A film information detecting unit 24 detects information representing the film sensitivity of the silver salt film 10 or the like, and outputs the information to the exposure calculating circuit 25.

On the basis of the information from the photometric range selecting circuit 23 or the film information detecting unit 24, the exposure calculating circuit 25 calculates an exposure amount applied to the silver salt film 10 and outputs the result to the shutter control unit 4.

An AF/AE mode input unit 26 outputs, to a control circuit 30, an instruction for determining the distant measurement range output from the distance measurement range selecting circuit 22 or the photometric range output from the photometric range selecting circuit 23.

A post-processing information input unit 27 outputs correcting information such as exposure correcting information or color correcting information to the control circuit 30 upon completion of photographing for the silver salt film 10.

In order to inform a user of specific information input during post-processing for inputting the correcting information such as the exposure correcting information or the color correcting information, a superimposing information output circuit 28 outputs, through the read circuit 20, superimposing information for overlappingly displaying the correcting information on an object image monitor on the image monitor 21.

When a mode in which the post-processing is not performed is set, a monitor time setting unit 29 determines a period of time for which the object image is displayed upon completion of photographing, and the monitor time setting unit 29 outputs a determination signal to the control circuit 30. On the other hand, when a mode in which the post-processing is performed is set, the monitor time setting unit 29 outputs the determination signal to the control circuit 30 such that the photographed object image is kept displayed until the post-processing is completed.

A magnetic reading circuit 31 reads information recorded on the magnetic recording layer of the silver salt film 10.

Note that the control circuit 30 controls the operation of the entire camera system.

More specifically, in the first embodiment, the convex lens 1 and the concave lens 2 constituting the photographic lens are used completely independently of the single-focal-point lens 14 serving as a monitor lens. However, in the third embodiment, the convex lens 1 and the concave lens 2 are used as a photographic lens and a monitor lens up to the halfway.

A beam from the object image passes through the convex lens 1 and the concave lens 2 (although through the half mirror 33) to form the object image on the silver salt film 10. However, the beam from the object image passes through the convex lens 1, is reflected by the half mirror 33, is reflected by the mirror 34, and then passes through the concave zoom lens 32 to form the object image on the image pickup device 15.

More specifically, the monitor lens is constituted by the single-focal-point lens 14 in the first embodiment, but the monitor lens is constituted by the convex lens 1 and the concave zoom lens 32 in the third embodiment.

The focal length changing unit 5 has a mechanical mechanism in which the concave zoom lens 32 serving as the monitor lens is interlocked with the convex lens 1 and the concave lens 2 constituting the photographic lens and zoomed by the focal length changing unit 5 to make a change in focal length possible. For this reason, a photographic view angle on the silver salt film 10 is always set to be almost equal to a monitor view angle on the image pickup device 15.

In focusing, similarly, when the lens control unit 7 extends the convex lens 1 to focus an image on the image pickup device 15 on the basis of a contrast signal from the image pickup device 15, the image is also focused on the silver salt film 10.

Although the view angle of the silver salt film 10 is almost equal to the view angle of the image pickup device 15, the actual magnification of the image pickup device 15 is smaller than that of the silver salt film 10.

This is because, although the diagonal line of one frame of the film is about 40 mm, the diagonal line of the image pickup device 15 is 10 mm or less.

Note that the concave zoom lens 32 serving as a monitor lens has a view angle almost equal to that of the convex lens 1 and the concave lens 2 constituting the photographic lens in the third embodiment. For this reason, as in the first embodiment, a specific area of the image pickup device 15 which is subjected to a read operation need not be changed each time zooming is performed.

The image can be focused even in monitoring before photographing is performed. For this reason, the convex lens 1 and the concave lens 2 constituting the photographic lens need not be extended again.

Therefore, a simpler driving mechanism than that of the first embodiment can be obtained, and a parallax decreases.

FIG. 11 is a block diagram showing the arrangement of a camera system according to the fourth embodiment of the present invention.

The fourth embodiment is obtained by applying the camera system of the present invention to a single-lens reflex camera.

Referring to FIG. 11, a convex lens 1 having a positive power and a concave lens 2 having a negative power constitute a 2-group zoom lens. Note that each of the convex lens 1 and the concave lens 2 is constituted by a plurality of lenses.

A stop 35 is controlled by a stop control unit 36, and a focal-plane shutter 3 is controlled by a shutter control unit 4.

A focal length changing unit 5 changes the interval between the convex lens 1 and the concave lens 2 of the 2-group zoom lens to change a focal length. A focal length detecting unit 6 detects a focal length on the basis of the interval in the 2-group zoom lens.

A lens control unit 7 drives only the convex lens 1 to focus an image on the surface of a silver salt film 10, and a lens position detecting unit 8 detects the position of the convex lens 1 on the basis of the drive amount of the convex lens 1.

A cartridge 9 stores the silver salt film 10, and a film feeding unit 11 winds or rewinds the silver salt film 10. A film moving amount detecting unit 12 detects the moving amount of the silver salt film 10.

During film feeding, a magnetic recording circuit 13 supplies recording information to a magnetic head 13a for recording information on a magnetic recording layer coated on the silver salt film 10 except for a photographic screen.

Light passes through the convex lens 1, the stop 25, and the concave lens 2 and reaches a half mirror 37, and the light transmitted through the half mirror 37 reaches the silver salt film 10 and becomes photographic light. On the other hand, the light reflected by the half mirror 37 forms an image on a focusing screen 38, and the image is used for monitor.

Light transmitted through the focusing screen 38 is vertically and laterally inverted by a pentaprism 39 and reaches another half mirror 40, and the transmitted light is magnified by a magnifier 41, thereby constituting an optical finder. This optical finder is the same as that of a conventional single-lens reflex camera.

The light reflected by the half mirror 40 passes through a convex lens 42 to form an image on an image pickup device 15.

When the convex lens 1 is moved on the basis of a contrast signal on the image pickup device 15, and the image is focused on the focusing screen 38, the image is also focused on the image pickup device 15.

Note that the image pickup device 15 is constituted by a CCD (Charge Coupled Device) for transferring charges stored in photodiodes having several hundred thousands of pixels. Note that the image pickup device 15 is not limited to the CCD, and a device, e.g., a MOS image pickup device, having a function equivalent to that of the CCD may be used as the image pickup device 15.

A signal processing circuit 18 processes an image signal of the object image output from the image pickup device 15, and a still image signal of the object image processed by the signal processing circuit 18 is stored in a memory 19.

A read circuit 20 reads an object image signal from the signal processing circuit 18 to display an object image incident on the image pickup device 15 on an image monitor 21 in real time. The read circuit 20 also reads out, on the image monitor 21, the object image signal stored in the memory 19.

The image monitor 21 actually displays a signal output from the read circuit 20 on a screen.

A distance measurement range selecting circuit 22 uses necessary part of information of all the pixels processed by the signal processing circuit 18 to check whether the object image on the image pickup device 15 is in a near-focus state or in a far-focus state and to calculate a direction in which the object image is offset and a distance by which the object image is offset, and the distance measurement range selecting circuit 22 outputs a detection signal to the lens control unit 16.

A photometric range selecting circuit 23 uses necessary part of the information of all the pixels to output an illuminance on the image pickup device 15 to an exposure calculating circuit 25.

A film information detecting unit 24 detects information representing the film sensitivity of the silver salt film 10 or the like, and outputs the information to the exposure calculating circuit 25.

On the basis of the information from the photometric range selecting circuit 23 or the film information detecting unit 24, the exposure calculating circuit 25 calculates an exposure amount applied to the silver salt film 10 and outputs the result to the shutter control unit 4.

An AF/AE mode input unit 26 outputs, to a control circuit 30, an instruction for determining the distant measurement range output from the distance measurement range selecting circuit 22 or the photometric range output from the photometric range selecting circuit 23.

A post-processing information input unit 27 outputs correcting information such as exposure correcting information or color correcting information to the control circuit 30 upon completion of photographing for the silver salt film 10.

In order to inform a user of specific information input during post-processing for inputting the correcting information such as the exposure correcting information or the color correcting information, a superimposing information output circuit 28 outputs, through the read circuit 20, superimposing information for overlappingly displaying the correcting information on an object image monitor on the image monitor 21.

When a mode in which the post-processing is not performed is set, a monitor time setting unit 29 determines a period of time for which the object image is displayed upon completion of photographing, and the monitor time setting unit 29 outputs a determination signal to the control circuit 30. On the other hand, when a mode in which the post-processing is performed is set, the monitor time setting unit 29 outputs the determination signal to the control circuit 30 such that the photographed object image is kept displayed until the post-processing is completed.

A magnetic reading circuit 31 reads information recorded on the magnetic recording layer of the silver salt film 10.

Note that the control circuit 30 controls the operation of the entire camera system.

Since the fourth embodiment has the same arrangement as that of a single-lens reflex camera, a monitor lens, i.e., the concave zoom lens 32 in the third embodiment, need not be moved. For this reason, the fourth embodiment has a simpler lens barrel mechanism than that of the third embodiment.

Note that the optical finder is not necessarily arranged. In this case, the half mirror 40 may be constituted by a full mirror.

According to the camera system, in photographing, an image almost equivalent to an image obtained after the photographing can be seen.

According to the camera system, in photographing, an image almost equivalent to an image obtained after the photographing can be seen. Necessary correction of developing and printing operations can be performed by a monitor image.

According to the camera system, data can be corrected depending on personal preferences.

According to the camera system, a monitor read time can be properly switched, resulting in convenience.

According to the camera system, data can be corrected even in a film removed from a camera.

As has been described above, according to the first to fourth embodiments, there can be provided a camera in which a photographed object image can be immediately confirmed, and correction of exposure and a view angle and trimming for the photographed object image can be performed, i.e., correcting information can be input.

The fifth and sixth embodiments of the present invention will be described below with reference to FIG. 12 to 24.

FIG. 12 is a block diagram showing the arrangement view of a camera according to the fifth embodiment of the present invention.

As shown in FIG. 12, zoom lenses 101 and 102 constituted by convex and concave lenses, a stop 103 for applying proper exposure to a film 105, and a half mirror 106 are arranged on the optical path of an incident object light. A mirror 107 for reflecting all light components is arranged on the optical path of the light reflected by the half mirror 106. Note that the stop 103 is arranged between the zoom lens 101 and the zoom lens 102.

A two-dimensional image pickup device 109 and a lens 108 for forming an object image on the image pickup device 109 are arranged on the optical path of the light reflected by the mirror 107. Note that the size of an image pickup area of the image pickup device 109 is set to be smaller than the frame size of the film 105 by inserting the image formation lens 108.

Reference numeral 108' denotes a field lens arranged near an image formation point. The field lens 108' is used to converge light components on the image formation lens 108 to prevent the object image from being eclipsed by the image formation lens 108.

The film 105 is arranged through a shutter 104 on the optical path of the light transmitted through the half mirror 106. As described above, one half of the light from the object is transmitted through the half mirror 106 and guided to the film 105, and the other half is reflected by the half mirror 106.

A signal processing unit 110 for processing a signal to store an output signal from the image pickup device 109 and to perform a monitor display and AF and AE calculations is connected to the image pickup device 109. An image memory 111 for storing a digital image signal from the signal processing unit 110, an LCD monitor 112 for displaying an output from the signal processing unit 110 as a moving image or a still image, and an AF calculating unit 113 are connected to the signal processing unit 110.

An AF control unit 114 for extending/withdrawing the first-group lens 101 to focus an image on the film 105 and the image pickup device 109 is connected to the AF calculating unit 113.

A zoom control unit 115 for driving and controlling the zoom lenses 101 and 102 is coupled to the zoom lenses 101 and 102 to change the focal length of a photographic lens. A stop control unit 117 is connected to the stop 103. A shutter control unit 118 is connected to the shutter 104, and a film winding unit 119 for controlling film feeding is connected to the film 105.

An AE calculating unit 116 for determining, on the basis of an output from the signal processing unit 110, specific exposure for the film 105 and determining a combination between an aperture value and a shutter speed is connected to the stop control unit 117 and the shutter control unit 118. On the basis of an output from the AE calculating unit 116, the stop control unit 117 and the shutter control unit 118 control the stop 103 and the shutter 104, respectively.

A zoom input unit 120 of an operating unit for changing the focal length of the photographic lens, a release input unit 121 of the operating unit for generating a 1st release signal indicating a half-depressed state of a release button and a 2nd release signal indicating a full-depressed state of the release button to start a photographing operation, and a monitor selecting unit 122 for selecting how the moving image of the object and a still image in photographing are displayed on the LCD monitor 112 are electrically connected to a control unit 123 for controlling the entire system.

In addition to the above units, the control unit 123 is also connected to the signal processing unit 110, the image memory 111, the AF control unit 114, the zoom control unit 115, the AE calculating unit 116, and the film winding unit 119. These units are controlled by the control unit 123.

Figure 13:
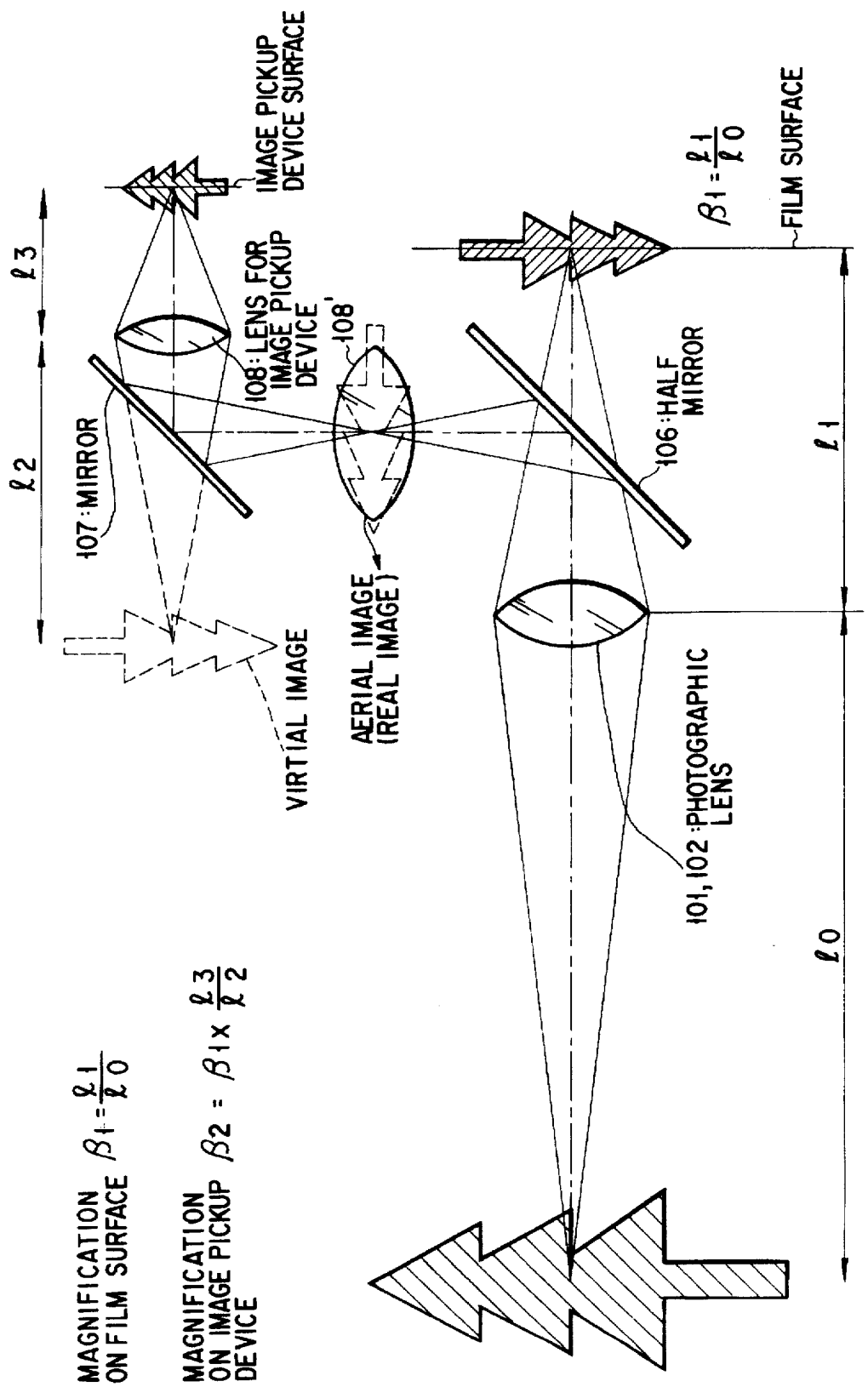
FIG. 13 is a view showing a state in which an object image is formed on a film 105 and an image pickup device 109 through an optical system, according to the fifth embodiment.

FIG. 13 shows a state in which an object image is formed on the film 105 and the image pickup device 109 through an optical system. Note that the zoom lenses 101 and 102 are represented by one convex lens in FIG. 13.

Referring to FIG. 13, the magnification of an object image on the film 105 surface is represented by a ratio of an object distance $l_0$ to a distance $l_1$ between the principal point of the lens and the film, i.e., $\beta_1 = l_1/l_0$. An aerial image is formed at the conjugate position with respect to the film surface by light reflected by the half mirror 106. An aerial image reduced by the lens 108 for the image pickup device is formed on the image pickup device 109. The reduction ratio is equal to a ratio of the distance $l_2$ between the conjugate virtual image of the aerial image and the principal point of the lens 108 to a distance $l_3$ between the principal point and the image pickup device, i.e., $l_3/l_2$.

A ratio of a film frame size to the screen size of the image pickup device is $l_3/l_2$, and an image magnification $\beta_2$ on the image pickup device 109 using the image pickup device 109 smaller than the film frame is represented by the following equation:

$$\beta_2 = \beta_1 \times (l_3/l_2) = (l_1/l_0) \times (l_3/l_2) \tag{1}$$

Figure 14:
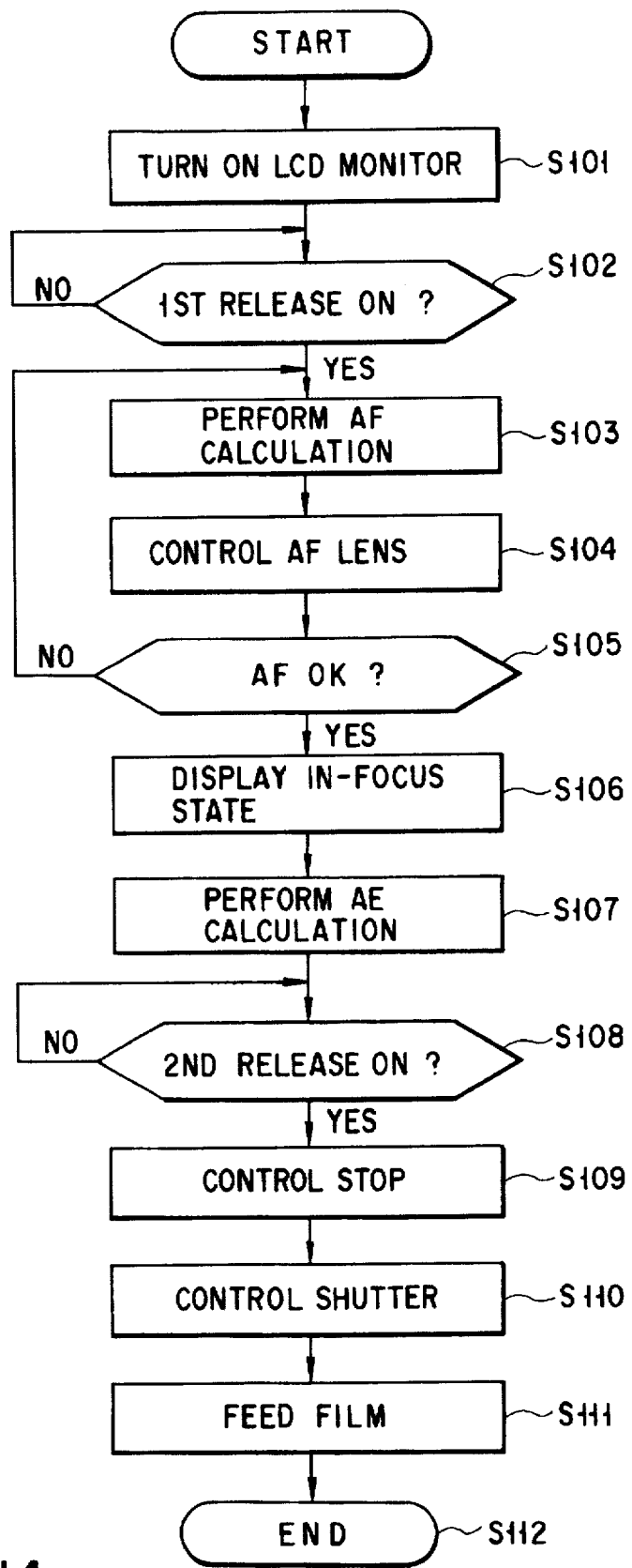
FIG. 14 is a flow chart showing a sequence when the photographed screen display of the camera according to the fifth embodiment is set in "OFF"

A sequence performed when the photographed screen display of the camera according to the fifth embodiment is set in "OFF" will be described below with reference to the flow chart in FIG. 14.

When the power supply of the camera is turned on, the LCD monitor 112 is turned on. Light from an object is incident on the camera through the zoom lenses 101 and 102, reflected by the half mirror 106, and then reflected by the mirror 107 to cause the lens 108 to form an image on the image pickup device 109. This image pickup device 109 transfers an analog output for each pixel to transmit the analog output to the signal processing unit 110. This signal processing unit 110 uses the LCD monitor 112 to display the output signal. An object image is displayed on the LCD monitor 112 as a moving image. Note that the moving image here means a sequence in which the motion of an object is directly displayed as in the monitor of a video camera (step S101).

When a user half depresses the release button to output the 1st release signal, of outputs from the image pickup device 109, only outputs near the central portion of the screen are A/D-converted by the signal processing unit 110 to transmit the converted outputs to the AF calculating unit 113 (step S102).

Subsequently, the AF calculating unit 113 sums up the absolute values of differences between adjacent pixels. The result can be represented by the following equation:

$$\Delta V = \sum_{i,j}^{n} |V_{i+1,j} - V_{i,j}| \tag{2}$$

where $\Delta V$ is a so-called contrast signal. An in-focus point is a point where the value of $\Delta V$ is maximum. The focusing lens 101 is driven such that the value is set to be maximum in the AF control unit 114 on the basis of the output $\Delta V$ from the AF calculating unit 113. The above operation is continued until the in-focus point is found (steps S103 to S105).

When the focusing operation is completed (step S105), the control unit 123 displays an in-focus state on the LCD monitor 112 to inform the user that the in-focus point is found, and the object image is clearly displayed on the LCD monitor 112. For this reason, the user can confirm the object image (step S106).

Subsequently, the control unit 123 calculates an exposure value required for the film 105 on the basis of the A/D values of only the image pickup device outputs from the AF calculating unit 113 which are near the central portion of the screen. In general, when it is assumed that the logarithmically compressed value of an object luminance, the APEX value of a film speed, an aperture value, and a time value are represented by BV, SV, AV, and TV, respectively, a proper exposure value EV required for the film 105 is represented by:

$$EV=BV+SV=AV+TV$$

Note that the aperture value AV and the time value TV are determined by predetermined calculations (step S107). Subsequently, when the release button is fully depressed, the 2nd release signal is output (step S108), the stop control unit 117 and the shutter control unit 118 supply the proper exposure to the film on the basis of the calculation value. When the shutter 104 is closed, the film winding unit 119 winds the film 105 by one frame (steps S109 to S111). In this manner, the whole sequence is ended.

As is apparent from the sequence described above, in a photographed screen display OFF mode, the LCD monitor 112 displays the object image as a moving image at any time.

A sequence performed when a mode in which a photographed screen is kept displayed until the next releasing operation is selected by the monitor selecting unit 122 in the fifth embodiment will be described below with reference to a flow chart in FIG. 15.

Since the sequence performed from when the power supply is turned on to when the LCD monitor 112 displays the object as a moving image is the same as that (steps S101 to S110) in the OFF mode, a description thereof will be omitted (steps S121 to S130).

In processes from step S131, the signal processing unit 110 A/D-converts outputs from the image pickup device 109 in units of pixels at a timing equal to a timing when the film 105 is exposed in an exposing operation of the shutter, and the digital signals are stored in the image memory 111 (step S131).

The display of the moving image of the object which has been displayed is set OFF, i.e., (the LCD monitor 112 is turned off), and the digital signals stored in the image memory 111 are output to the signal processing unit 110. The signal processing unit 110 D/A-converts the digital signals, outputs them as analog signals, and transmits the analog signals to the LCD monitor 112 (steps S132 and S133).

Therefore, the object image obtained at a timing when the film 105 is exposed is displayed on the LCD monitor 112 as a still image at any time. When a user watches the display of the still image, the user can immediately confirm the composition of the image, the expression of the object, or the like (steps S134 to S136).

When the release button is half depressed to output a 1st release signal, the still image which has been displayed on the LCD monitor 112 is set OFF (step S137), and the current condition of the object is displayed as a moving image (step S138). Note that, since the information of the still image is stored in the image memory 111, the still image can be easily confirmed again by inputting the frame number later.

Figure 16:
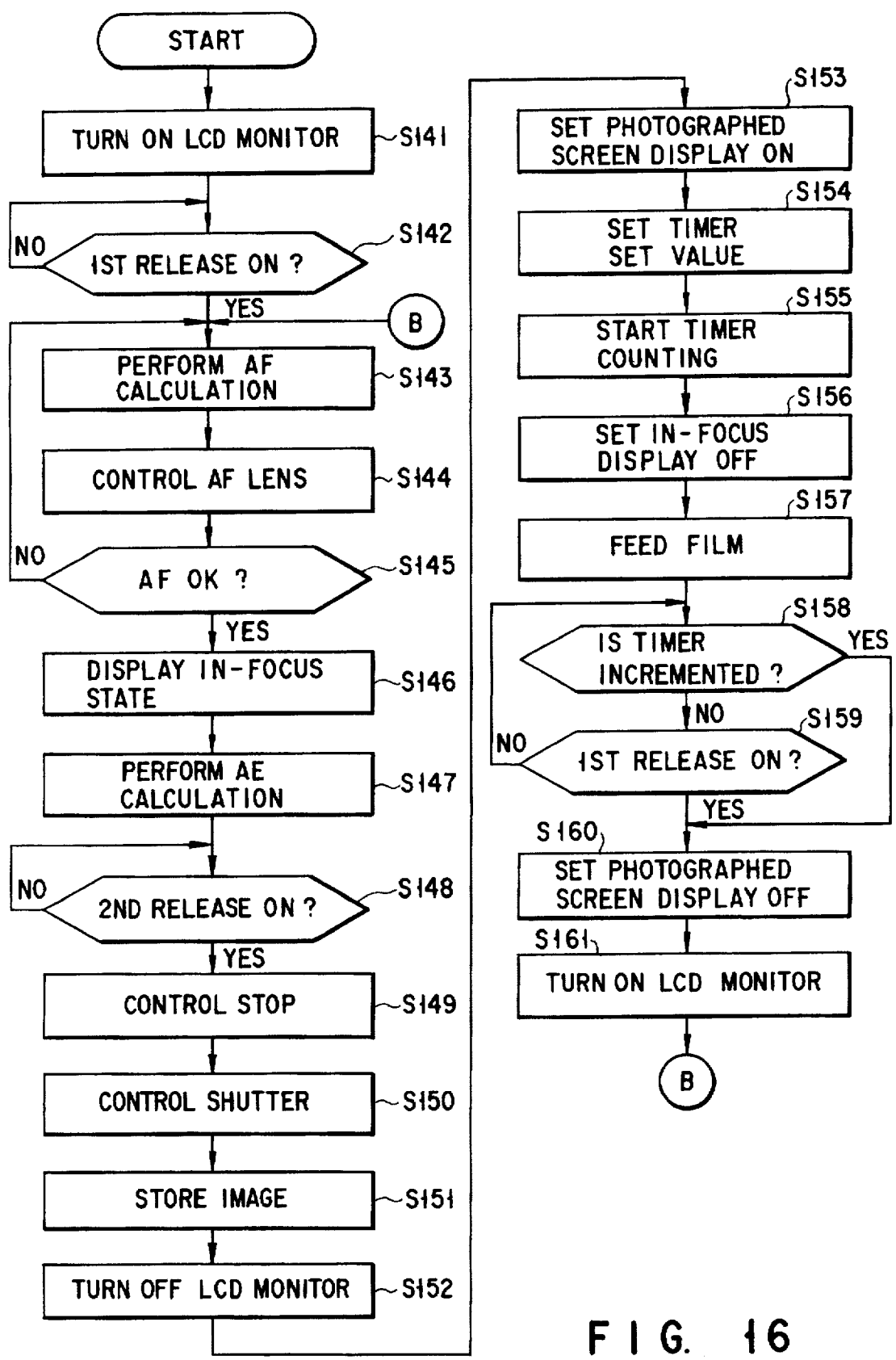
FIG. 16 is a flow chart showing a sequence when a mode in which a photographed image is kept displayed for a predetermined period of time or until next release.

A sequence performed when a mode in which a photographed screen is kept displayed for a predetermined period of time or until next release is selected by the monitor selecting unit 122 in the fifth embodiment will be described below with reference to a flow chart in FIG. 16.

When this mode is selected, after a shutter operation, the photographed object image can be confirmed as a still image for a predetermined period of time (e.g., 5 seconds). After the predetermined period of time has passed, the display of the still image automatically returns to the display of a moving image. However, even before the predetermined period of time of period passes, when the 1st release signal is output by half depressing the release button, this operation causes the display of the still image to return to the display of the moving image (steps S154 to S161). Since the remaining sequence (steps S141 to S153) is the same as the sequence of the steps S121 to S133, a description thereof will be omitted.

FIG. 17 is a view showing the arrangement of a camera according to the sixth embodiment of the present invention.

Referring to FIG. 17, a signal synthesizing unit 124 synthesizes a plurality of image signals with each other to simultaneously display a plurality of screens on a LCD monitor 112. A recording unit 125 detachably arranged in the camera is a so-called video movie unit for recording a moving image of an object using a magnetic tape. A winding mode input unit 126 switches single/continuous modes for film feeding. Since the remaining arrangement of the camera is the same as that of the camera according to the fifth embodiment, a description thereof will be omitted. The same reference numerals as in the fifth embodiment denote the same parts in the sixth embodiment.

Figure 18:
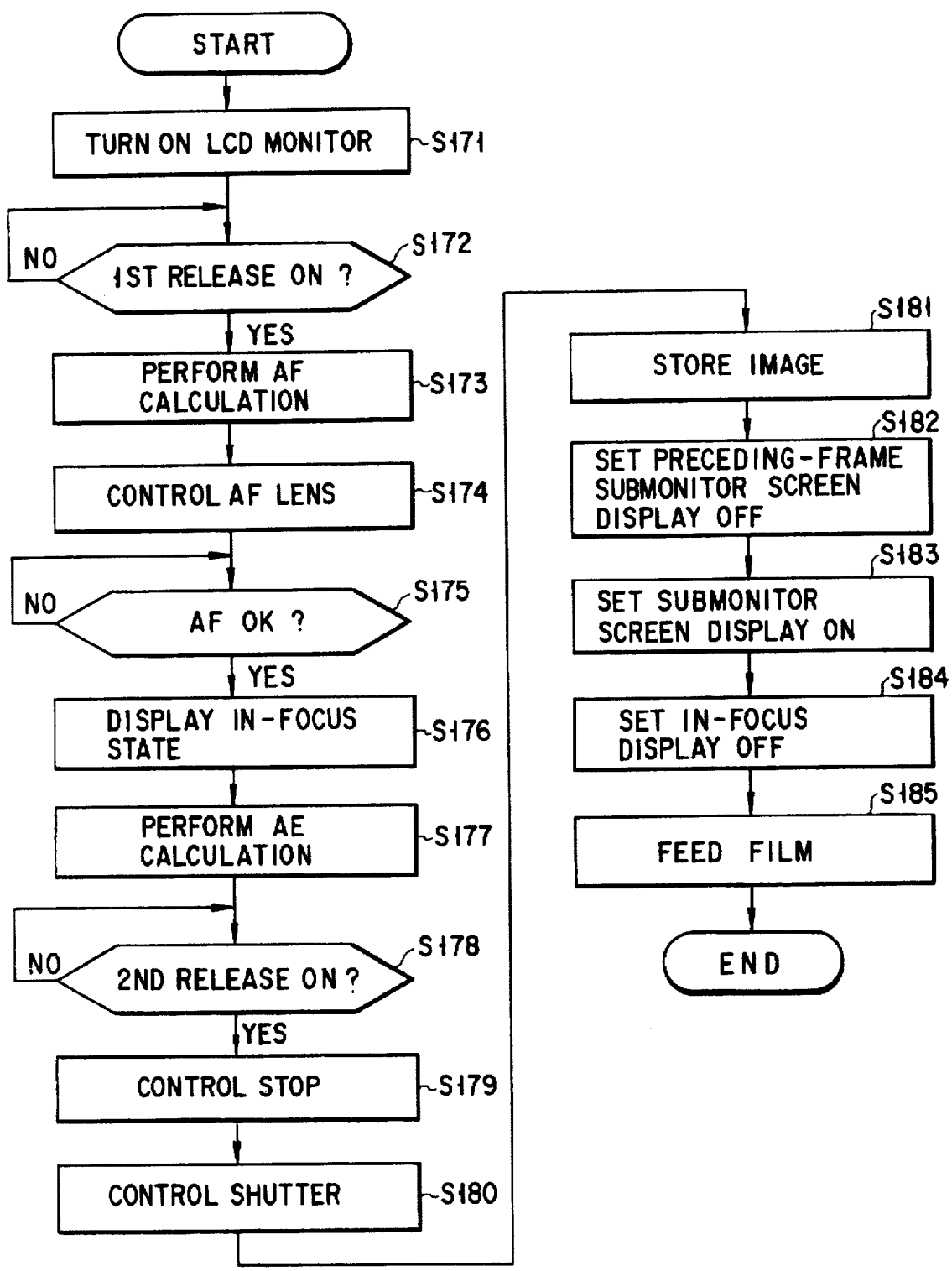
FIG. 18 is a flow chart showing a submonitor display sequence according to the sixth embodiment.

A submonitor display sequence according to the sixth embodiment will be described below with reference to a flow chart in FIG. 18.

In this sequence, until a shutter operates, a moving image is kept displayed as in the sequence of steps S121 to S130 shown in FIG. 15 (steps S171 to S180). When a shutter 104 operates to store an image related to an object image in an image memory 111, as shown in FIG. 19, a small still image is displayed on the lower left portion on an LCD monitor 112 (steps S182 to S186). Therefore, a photographer can confirm a preceding-frame screen using a submonitor display at any time.

Figure 21:
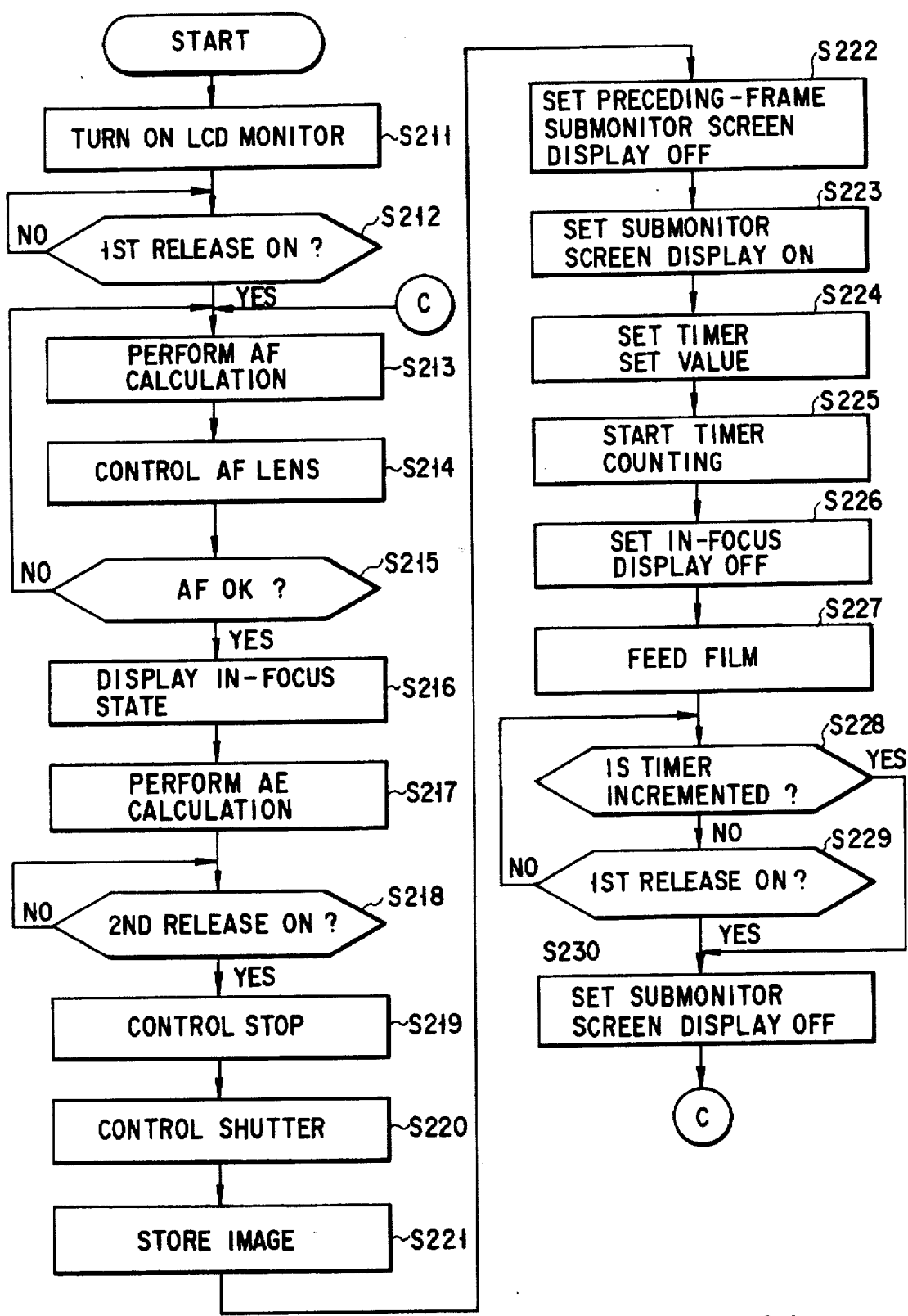
FIG. 21 is a flow chart showing a sequence in which a submonitor display is kept performed according to the sixth embodiment until a timer counts up or a next 1st release signal is output.

A sequence in which a submonitor display according to the sixth embodiment is kept performed until a timer counts up or a next 1st release signal is output will be described below with reference to a flow chart in FIG. 21.

In this sequence, until the shutter operates, a moving image is kept displayed as in the sequence of steps S121 to S130 in FIG. 15 (steps S211 to S220). When the shutter 104 operates to store an image related to an object image in the image memory 111, as shown in FIG. 19, a small still image is displayed on the lower left portion on the LCD monitor 112. When the timer counts up or the 1st release signal is output, the submonitor screen display is set OFF (steps S228 to S230), and the processes from step S213 are repeated again.

Figure 22:
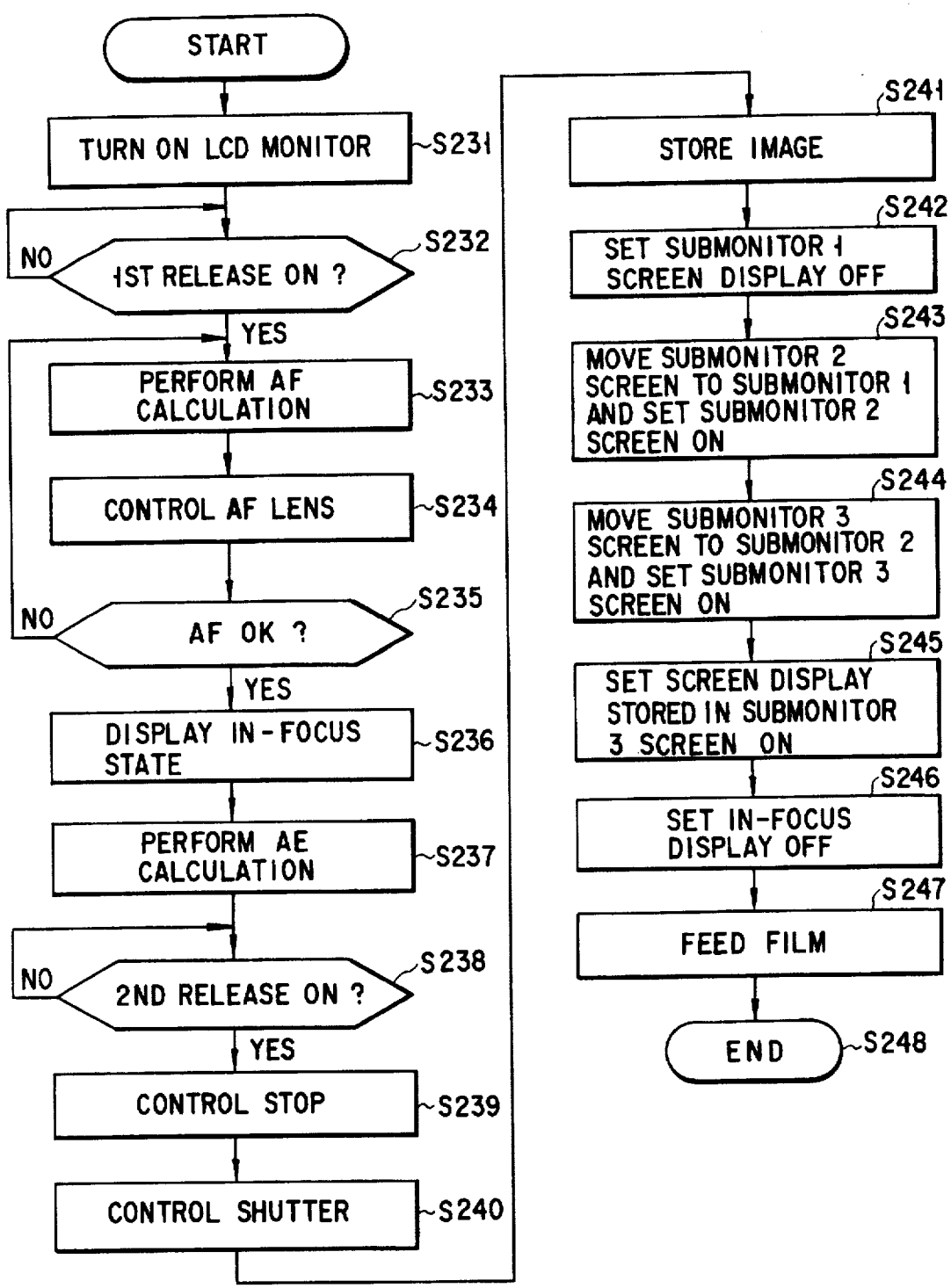
FIG. 22 is a flow chart showing a sequence when a scheme in which a submonitor screen according to the sixth embodiment has three screens.

A sequence when a scheme in which a submonitor screen display has three screens will be described below with reference to a flow chart in FIG. 22. In this sequence, still images of three frames are displayed as shown in FIG. 20.

More specifically, in this sequence, until the shutter operates, a moving image is kept displayed as in the sequence in steps S121 to S130 in FIG. 15 (steps S231 to S240).

When a shutter 104 operates to store an image related to an object image in the image memory 111, the display of submonitor 1 is set OFF, an image which has been displayed on submonitor screen 2 is displayed on submonitor screen 1, an image which has been displayed on submonitor screen 3 is displayed on submonitor screen 2, an image which is newly stored in the image memory 111 is displayed on submonitor screen 3 (steps S242 to S245). An in-focus display is set OFF, and then film feeding is performed. Thereafter, all the operations are ended (steps S247 and S248).

As described above, in this sequence, frames are shifted every shutter operation to sequentially turn off the displays of the frames from the display of the oldest frame. For this reason, the latest image is displayed on the submonitor screen and can be confirmed at any time. Note that the sequence performed in mode selection may be continuously switched to be interlocked with film feeding.

Changes in display contents based on the above sequence processes will described below.

Figure 23:
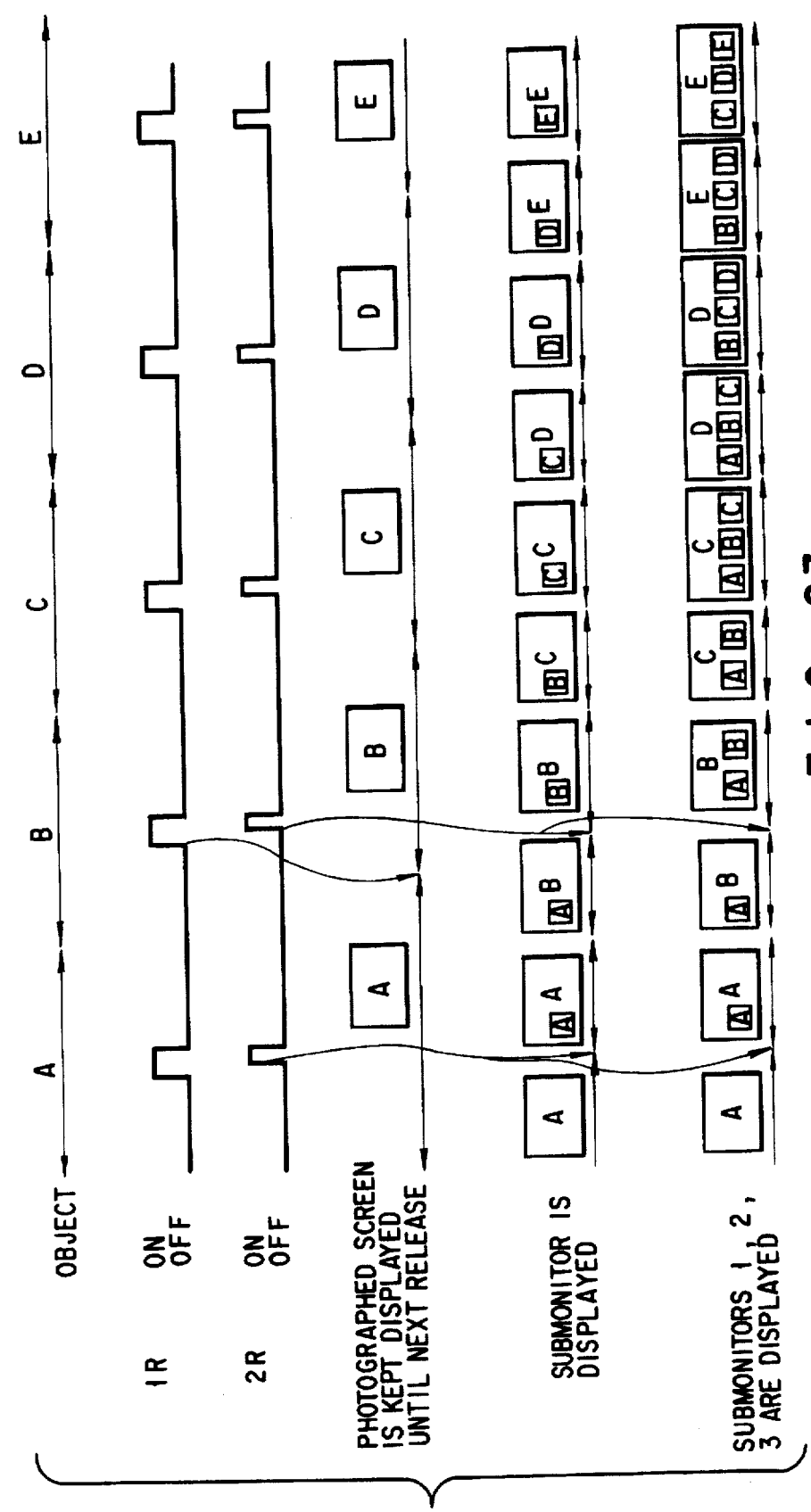
FIG. 23 is a timing chart showing comparison between the display mode of a photographed screen, the display mode of a submonitor, the display modes of submonitors 1, 2, and 3 until next release according to the sixth embodiment.
Figure 24:
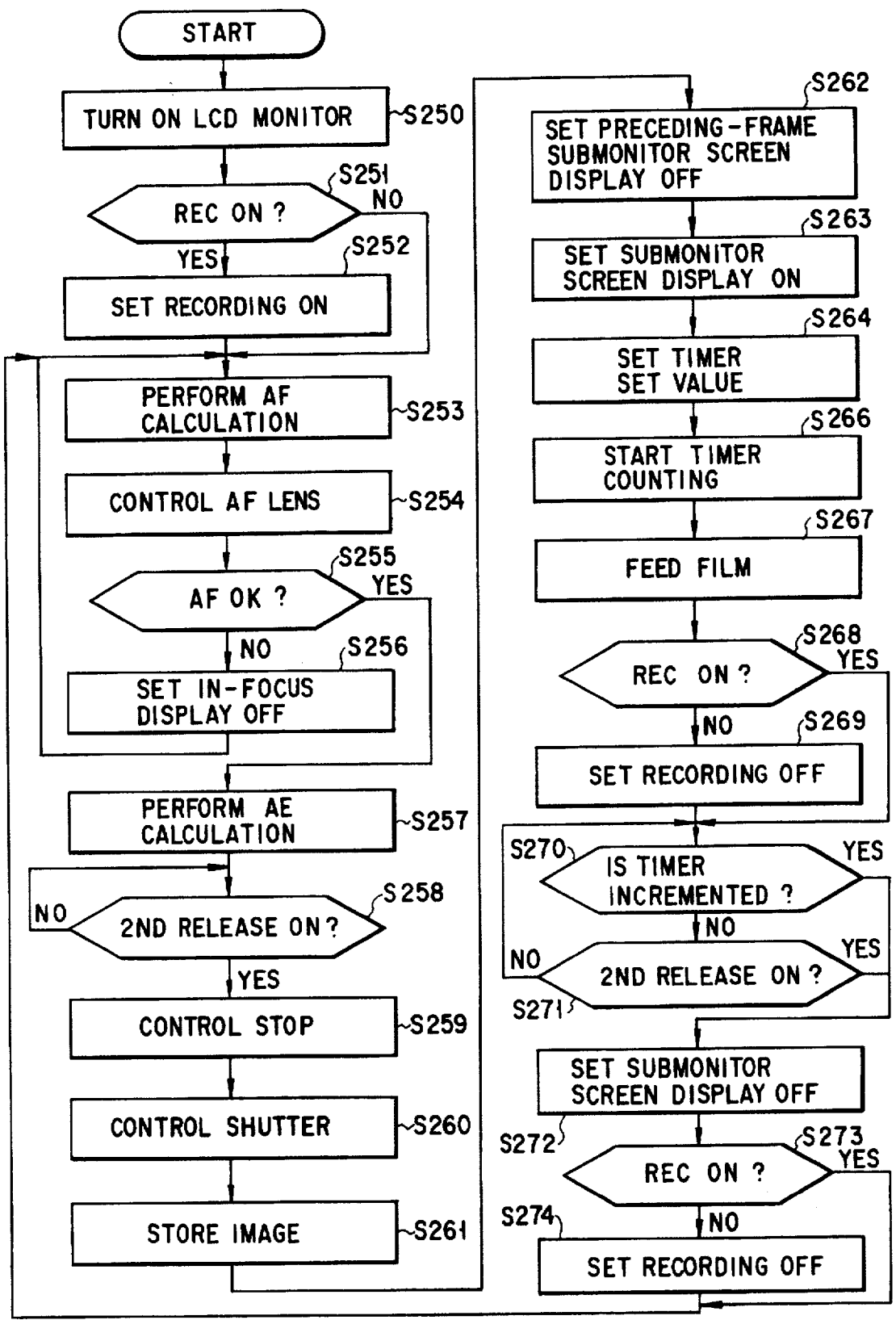
FIG. 24 is a flow chart showing the sequence of the camera when a detachable recording unit 125 is connected to the camera according to the sixth embodiment.

FIG. 23 is a timing chart for comparing modes in which a photographed screen display, a submonitor display, submonitor displays 1, 2, and 3 are changed/displayed in synchronism with 1st and 2nd release signal outputs. FIG. 23 shows changes in contents of the monitor displays when objects A to E change. Note that the abscissa indicates a time axis.

Assume that a mode in which a photographic screen is kept displayed until next release is selected. In this case, when the next 1st release signal is output, the display is switched to a screen display related to an object at this time in synchronism with the ON timing of the 1st release.

When a mode in which a submonitor display is performed is selected, preceding-frame image information is not recorded in the first photographing. For this reason, only an image related to the object A at this time is displayed, and the submonitor display is not performed. Thereafter, in synchronism with a 2nd release signal output, an image related to the object A at this time is displayed as a submonitor display. Even if the object A is changed to the object B, the submonitor display is not changed until the 2nd release signal is output after the object A is changed to the object B. In synchronism with the next 2nd release signal outputs, the submonitor display is changed to a submonitor display related to the object B. Note that, when the object A is changed to the object B, and the object B is changed to the object C, a main monitor display is changed to a main monitor display related to the changed object at any time.

Assume that a mode in which submonitors 1, 2, and 3 are displayed is selected. In this case, when the object A is changed to the object B and the object C, the images of, e.g., three latest preceding frames are sequentially displayed on the submonitors from the left. A case wherein the object D is photographed is considered. In this case, information related to the objects A to C is recorded in the image memory 111. Until the 2nd release signal is output in photographing the object D, the screens of the objects A, B, and C are kept displayed on submonitors 1, 2, and 3, respectively. When the 2nd release signal is output in photographing the object D, the image related to the oldest object A is erased in response to the ON timing of the 2nd release, the images related to the objects B and C are shifted to the left by one and respectively displayed on submonitors 1 and 2. The image related to the object D is displayed on submonitor 3 on the leftmost side.

Finally, the sequence of a camera according to the sixth embodiment when a detachable recording unit 125 is brought into contact with the camera will be described below.

When the recording unit 125 in which the photographic optical system and image pickup device of a video movie camera are not arranged is connected to the camera, a moving image can be recorded on a video tape simultaneously with recording on a silver salt film.

In this sequence, when the power supply of the camera is turned on, the LCD monitor 112 is turned on to monitor a moving image of an object (step S250). In this case, when a recording (REC) button (not shown) for recording a moving image is set ON (step S251), the video tape is fed to start recording (step S252).

An AF calculation is performed to drive and control an AF lens on the basis of the information. If AF is not completed, an in-focus display is set OFF, and this operation is repeated (steps S253 to S256). If AF is completed (step S255), an AE calculation is subsequently performed (step S257).

When a moving image having the best composition to be recorded on the film is obtained in recording an object, the release button is fully depressed. In this case, the 2nd release signal is output, and the shutter operates to perform exposure (steps S258 to S260). At this time, the image memory 111 stores an object image at that time (step S261). In this case, the signal synthesizing unit 124 synthesizes the stored signal with a signal output from a signal processing unit 110, and the synthesized signal is displayed on the LCD monitor 112.

The submonitor screen display of the preceding frame is set OFF, and the screen at this time is displayed on the submonitor (steps S262 and S263). A timer set value is set to start timer counting (steps S266 and S267), a film 105 is fed (step S267).

If the REC button is not turned on (step S268), recording is ended (step S269). If the REC button is turned on (step S268), the still image on the submonitor screen is kept displayed for a predetermined period of time or until the next 2nd release signal is output (steps S270 to S272).

It is checked again whether the REC button is turned on/off (step S273). If the REC button is turned off, recording is ended, and the processes from step S253 are performed (steps S273 and S274).

As has been described in detail, in a camera according to the fifth and sixth embodiments, a photographer can selectively and immediately display and confirm previously photographed screens by an arbitrary display method.

According to the fifth and sixth embodiments of the present invention, there can be provided a camera capable of selectively displaying and confirming the states of all the photographed screens by a display method desired by a photographer.

The seventh to ninth embodiments of the present invention will described below with reference to FIGS. 25 to 37.

FIG. 25 is a block diagram showing the arrangement of a camera having a properness/improperness display means according to the seventh embodiment of the present invention.

As shown in FIG. 25, 2-group zoom lenses 201 and 202 constituted by convex and concave lens groups, a stop 203, and a half mirror 206 are arranged on the optical path of an object, and a mirror 207 is arranged on the optical path of light reflected by the half mirror 206. An image formation lens 208 and an image pickup device 209 are arranged on the optical path of the light reflected by the mirror 207. The stop 203 is arranged between the zoom lens 201 and the zoom lens 202.

A focal-plane shutter 204 and a film 205 are arranged on the optical path of light transmitted through the half mirror 206. Therefore, one almost half of the light passing through the zoom lenses 201 and 202 is transmitted to the film 205 side, and the other half is reflected upward. An object image forms an aerial image at the conjugate position with respect to the film 205, is reflected by the mirror 207, and causes the image formation lens 208 to form an image on the image pickup device 209.

The size of the entire image area of the image pickup device 209 is set to be smaller than the frame size of the film 205 due to insertion of the image formation lens 208. The image pickup device 209 is constituted by a light-receiving unit having several hundred thousands of pixels and a CCD (Charge Coupled Device) for transferring charges generated by the light-receiving unit. In this light-receiving unit, R, G, and B color filters are formed on the respective pixels in a predetermined pattern.

The output of the image pickup device 209 is connected to the input of a preamplifier 210, and the output of the preamplifier 210 is connected to the input of an FM modulating circuit 214 through a signal processing circuit 211, a luminance signal processing circuit 212, and a chrominance signal processing circuit 213. Output signals from the image pickup device 209 are amplified by the preamplifier 210 and subjected to predetermined processes by the luminance signal processing circuit 212 and the chrominance signal processing circuit 213. These signals are synthesized into one signal by the FM modulating circuit 214.

The output of the luminance signal processing circuit 212 is connected to the inputs of an AE calculating circuit 215 and an AE division calculating circuit 216, and the output of the AE division calculating circuit 216 is connected to the input of an AE address storing circuit 217. The AE calculating circuit 215 averages the luminance signals of the pixels of the entire screen to calculate an exposure value required for exposing the film 205.

The AE division calculating circuit 216 divides the frame into a plurality of areas, calculates a proper exposure for each area, and compares the proper exposure value of each area with the averaged exposure value of the entire frame. If the proper exposure value of an area is different from the averaged exposure value by a predetermined value or more, the address of this area is stored in the AE address storing circuit 217.

The output of the luminance signal processing circuit 212 is also connected to the input of a frequency dividing circuit 218, and the output of the frequency dividing circuit 218 is also connected to the input of an AF calculating circuit 219. The output terminal of the AF calculating circuit 219 is connected to the inputs of a lens control circuit 228 and an AF address storing circuit 221. The output of the AF division calculating circuit 220 is connected to the input of the AF address storing circuit 221. Note that the lens control circuit 228 drives the lens 201 on the basis of an output from the AF calculating circuit 219 to perform focusing.

The frequency dividing circuit 218 transmits a signal included in luminance signals from the image pickup device 209 and having a predetermined frequency band to the AF calculating circuit 219. The AF calculating circuit 219 uses a so-called hill-climbing scheme to detect a portion, of the entire screen, having the maximum contrast signal, thereby performing focusing. In addition, the AF division calculating circuit 220 divides the screen into a plurality of areas and calculates a portion having the maximum contrast signal for each divided area. The AF address storing circuit 221 compares the averaged focusing position of the entire screen with a position having the maximum contrast signal in each area. If the focusing position and the position having the maximum contrast signal have a difference of a predetermined value or more, the AF address storing circuit 221 stores the address of the corresponding area.

The outputs of the FM modulating circuit 214, the AE address storing circuit 217, and the AF address storing circuit 221 are connected to the inputs of the signal synthesizing circuit 222. Although an object image can be generally obtained by driving a monitor 224 with an output itself from the FM modulating circuit 214, the signal synthesizing circuit 222 synthesizes signals to color only a designated address area and display the colored address area when a display of "overexposure" or "underexposure" or an out-of-focal-depth display is to be performed with respect to a specific area.

The output of the signal synthesizing circuit 222 is connected to the input of the CCD monitor 224 through a monitor drive circuit 223 for driving the pixels of the CCD monitor 224. The input of the signal synthesizing circuit 222 is connected to the input of a memory 226 through an A/D converting circuit 225. This A/D converting circuit 225 A/D-converts an object image signal from the FM modulating circuit 214 into a digital signal, and the memory 226 stores the digital signal.

The output of the memory 226 is connected to the input of the signal synthesizing circuit 222 through a D/A converting circuit 227. The D/A converting circuit 227 converts the digital signal stored in the memory 226 into an analog signal again, and outputs the analog signal to the signal synthesizing circuit 222.

A lens position encoder 229 for outputting the position information of the zoom lens 201 is coupled to the lens 201, and the output of the lens position encoder 229 is connected to the inputs of the AF calculating circuit 219 and the AF division calculating circuit 220.

A stop control circuit 230 is connected to the stop 203, and a shutter control circuit 231 is connected to the shutter. The AE calculating circuit 215 and the AE address storing circuit 217 are connected to the stop control circuit 230 and the shutter control circuit 231. The stop control circuit 230 and the shutter control circuit 231 respectively control the stop 203 and the shutter 204 on the basis of an output from the AE calculating circuit 215.

A zoom circuit 232 is coupled to the zoom lenses 201 and 202 to change the focal length thereof, and a film feeding circuit 233 and a magnetic recording circuit 234 for recording information required for film magnetic recording Px are connected to the film 205. A cartridge code reading circuit 236 for reading a code on the outer surface of a cartridge is connected to a cartridge 235.

An operating unit 238 to which a user inputs information with various switches is connected to a control circuit 237. The outputs of the control circuit 237 are connected to the inputs of the stop control circuit 230, the zoom circuit 232, the shutter control circuit 231, the film feeding circuit 233, the magnetic recording circuit 234, the cartridge code reading circuit 236, the memory 226, the signal synthesizing circuit 222, the AF calculating circuit 219, AF division calculating circuit 220, the AE calculating circuit 215, and the AE division calculating circuit 216. In addition to the above units, the system is controlled by the control circuit 237.

Figure 26:
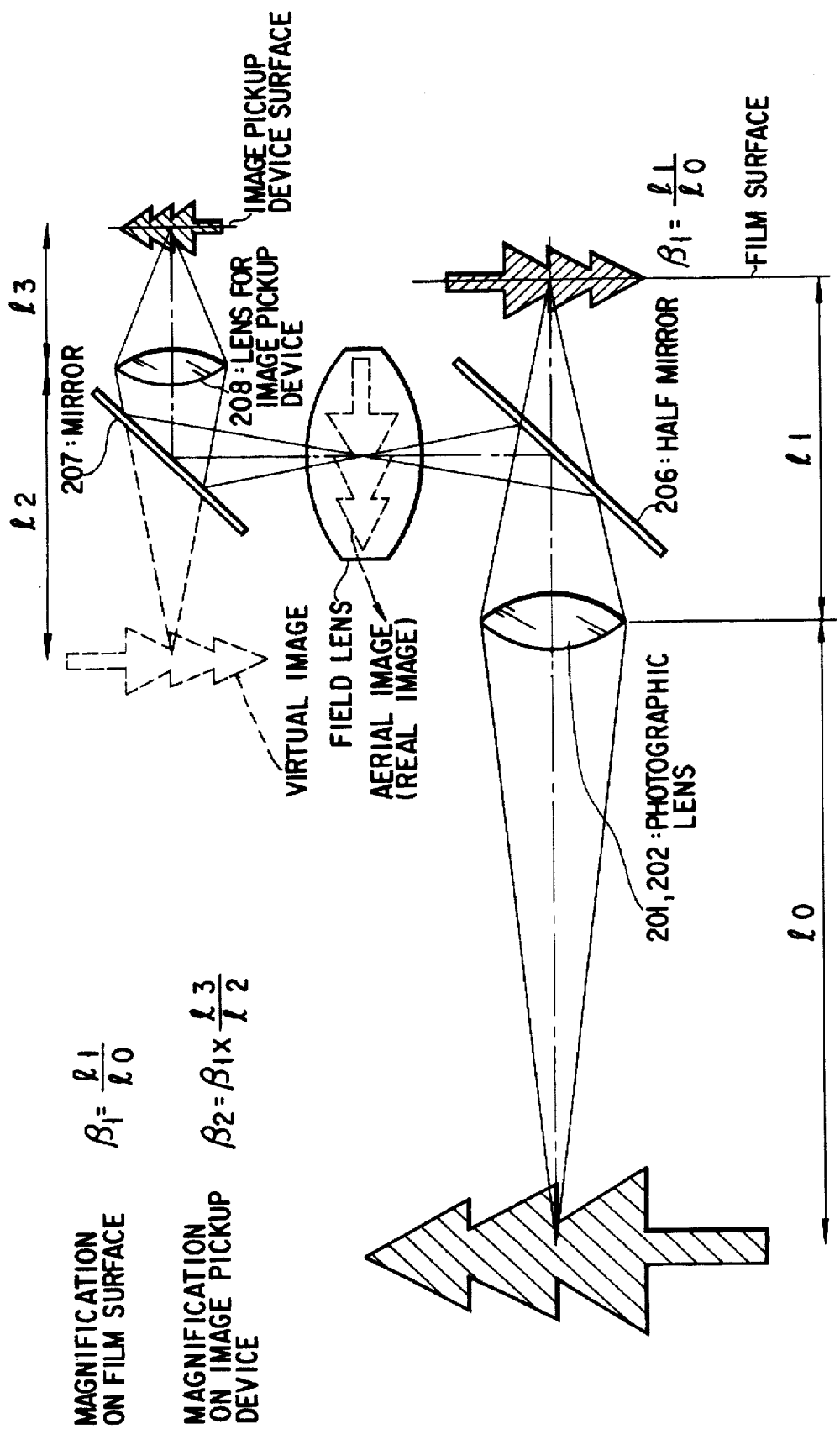
FIG. 26 is a view showing a state in which an object image is formed on a film 205 and an image pickup device 209 through an optical system.

FIG. 26 shows and explains a state in which object images are formed on the film 205 and the image pickup device 209 through an optical system. Note that, in FIG. 26, the zoom lenses 201 and 202 are represented by one convex lens.

Referring to FIG. 26, the image magnification of an object on the film 205 surface is represented by a ratio of an object distance $l_0$ to a distance $l_1$ between a lens principal point and the film, i.e., $\beta_1 = l_1/l_0$. Light reflected by the half mirror 206 forms an aerial image at a conjugate position with respect to the film surface. An aerial image reduced by the lens 208 for the image pickup device is formed on the image pickup device 209. The reduction ratio is equal to a ratio of a distance $l_2$ between the conjugate virtual image of the aerial image and the principal point of the lens 208 to a distance $l_3$ between the principal point and the image pickup device, i.e., $l_3/l_2$.

A ratio of a film frame size to the screen size of the image pickup device is $l_3/l_2$, and an image magnification $\beta_2$ on the image pickup device 209 using the image pickup device 209 smaller than the film frame is represented by the following equation which is the same as equation (1):

$$\beta_2 = \beta_1 \times (l_3/l_2) = (l_1/l_0) \times (l_3/l_2) \quad (3)$$

A field lens is arranged at a position where an aerial image is formed because part of light from the aerial image is prevented from being eclipsed by the lens 208 for an image pickup device.

Figure 27:
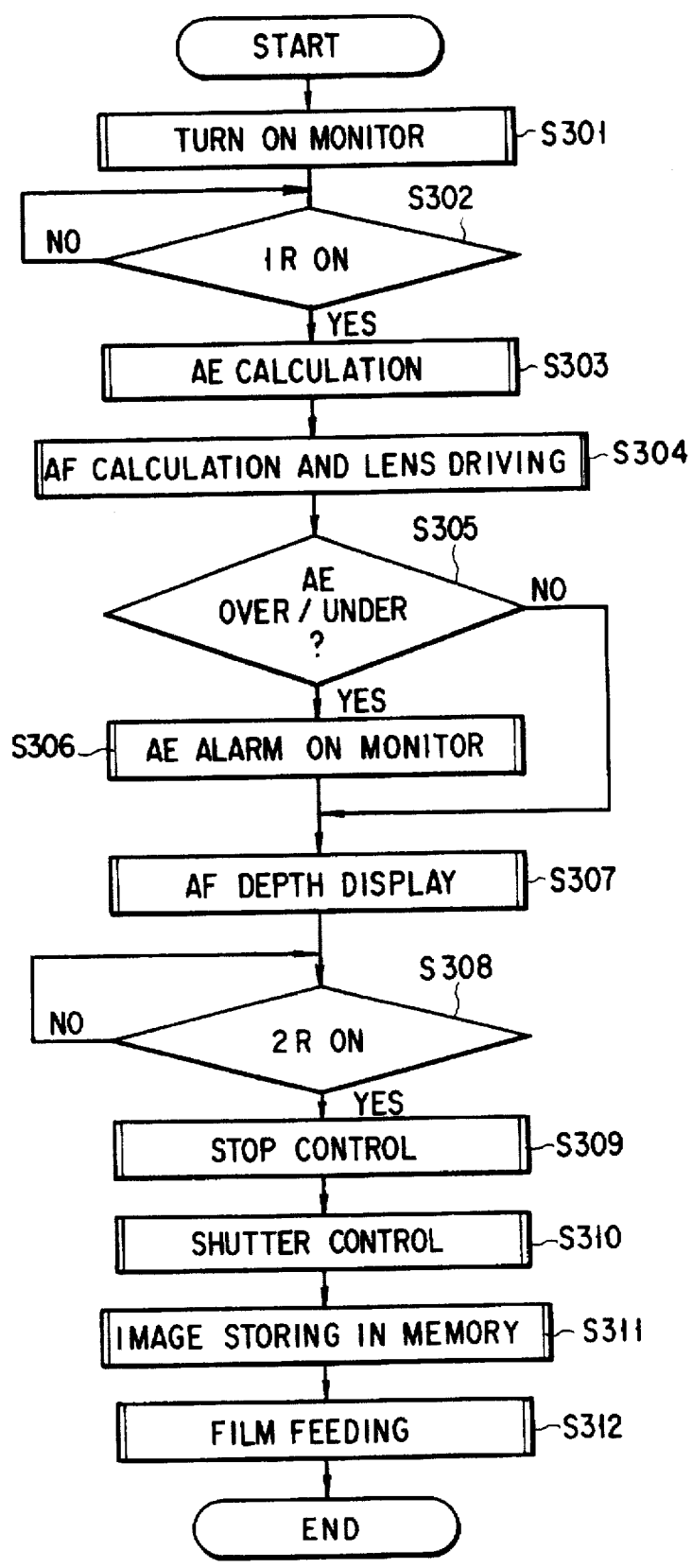
FIG. 27 is a flow chart showing the operation of the seventh embodiment.

The operation of the seventh embodiment will be described below with reference to a flow chart in FIG. 27. When a power switch (not shown) is turned on, the monitor 224 is turned on, and an object image on the image pickup device 209 is displayed on the monitor 224 (step S301).

When a release button is half depressed to output a 1st release signal (step S302), the AE calculating circuit 215 calculates luminance signal outputs of outputs from the image pickup device 209 which serve as outputs from the luminance signal processing circuit 212 for all the pixels to calculate the average value of the luminance signal outputs (step S303).

The AF calculating circuit 219 detects contrast signals for all the pixels while driving the lens control circuit 228 to cause the focusing lens 201 to perform scanning, and the lens 201 is stopped at a position where the maximum contrast signal is obtained (step S304). Note that each contrast signal can be obtained by adding the absolute values of the output differences of adjacent pixels.

This is expressed by the following equation which is the same as equation (2):

$$\Delta V = \sum_{i,j}^{n} |V_{i+1,j} - V_{i,j}| \quad (2)$$

The reference symbol $\Delta V$ denotes a contrast signal, and a position where the signal $\Delta V$ is maximum corresponds to the best in-focus position in the entire screen.

Upon completion of the lens driving, the AE division calculating circuit 216 calculates luminance signals for a plurality of areas, and compares these values with the average luminance of the entire image pickup device 209 (step S309). If the difference is equal to or smaller than the latitude of the film 205, no problem is posed. However, if the difference is larger than the latitude of the film 205, overexposure or underexposure of the corresponding area is displayed. The contents of the display are displayed on the monitor 224 such that, when overexposure or underexposure of each area is decided, the address of the corresponding area is stored in the AE address storing circuit 217, the signal synthesizing circuit 222 synthesizes the image signal of the object image, i.e., an output from the FM modulating circuit 214 with the address signal to color only the overexposure/underexposure area (step S306).

The state of this display is shown in FIG. 28. Referring to FIG. 28, a screen is divided into sixteen areas, and each area in which a luminance signal falls within the range of ±1 EV or more with respect to an average value BVAV=10.2 is hatched.

The camera operates to perform AF displays in the same manner as described above. More specifically, when the lens 201 performs scanning while calculating equation (2) for the entire screen, a contrast signal becomes a hill-climbing type signal, as shown in FIG. 29A.

According to the entire focusing, when the lens is set at a position where the contrast signal $\Delta V$ is maximum, a photograph having proper focusing can be taken. In this lens scanning, as shown in FIG. 29B, when the same calculation as described above is performed in each of a plurality of divided areas i=1 to 6 independently of the calculation for the entire screen, a hill-climbing signal can be obtained in each area. When a difference between an output from the lens position encoder 229 at the peak of each area and an output from the lens position encoder 229 at the peak of the entire screen is small, the corresponding area falls within a focal depth. When the difference is larger, the photograph of this area is defocused.

Assume that an aperture value of the lens at the brightness is represented by F, an allowable diameter of a circle of confusion on the film is represented by $\delta$, and a longitudinal magnification of the lens 201 with respect to the film surface is represented by $\beta^2$ (when the lens 201 moves by 1 mm, an object image moves by $1 \times \beta^2$ mm on the film surface). In this case, boundaries A and A' between the area within the focal depth and the defocused area are located at positions having a distance $\pm F \times \delta / \beta^2$ from an in-focus point O. Therefore, in areas i=1, 2, 4, and 5 in which the differences between the peak of the entire screen and the peaks of these areas fall within a range of $\pm F \times \delta / \beta^2$, in-focus states can be set. However, each of areas i=3 and 6 is defocused. In this embodiment, the addresses of the areas i=1, 2, 4, and 5 except for the defocused areas i=3 and 6 are stored in the AF address storing circuit 221, and the signal synthesizing circuit 222 colors these areas to display them.

Figure 30A:
FIGS. 30A, 30B, and 30C are views showing the states of screen displays in which an in-depth display is separated from an out-of-depth display.
Figure 30B:
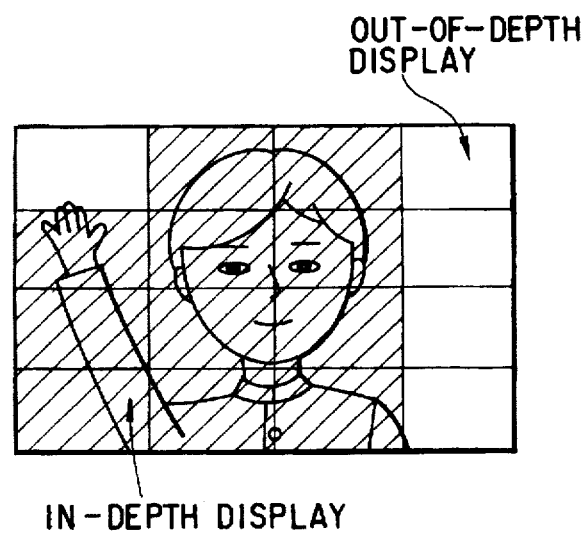
Figure 30C:
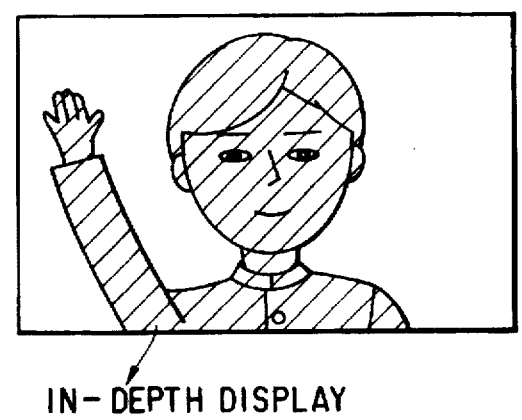

These states are shown in FIGS. 30A to 30C. Referring to FIGS. 30B and 30C, areas which are within the focal depth are hatched. Although FIG. 30B shows a display having 16 divided areas, when the display is divided more finely, a portrait itself can be expressed to be colored and displayed within the focal depth (FIG. 30C). As described above, the over/under AF or the AF depth is displayed. When the over/under AF or AF depth is not desired by a user, a composition or an aperture value may be changed. However, when the release button is fully depressed without any change, and a 2nd release signal is output, the object image is exposed on the film 205. At the same time, the object image is stored in the memory 226 as an electronic image, and photographic conditions can be confirmed later.

After these processes, the film is fed by one frame.

Figure 31:
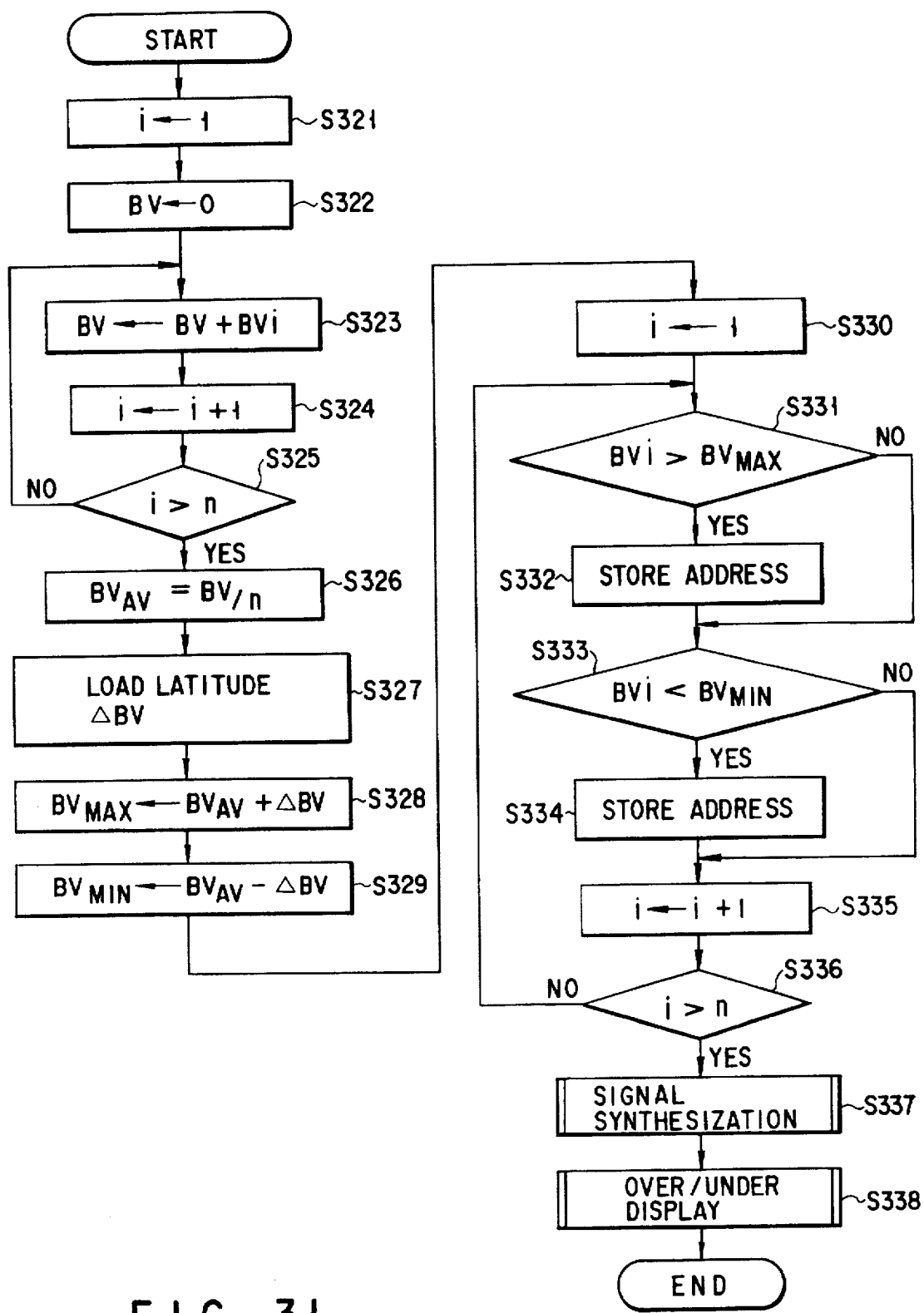
FIG. 31 is a flow chart showing an AE over/under display in detail.

FIG. 31 is a flow chart showing a sequence of an over/under AE display. In this sequence, the luminance signals of pixels are added, and the sum is divided by the number n of pixels to calculate an average luminance BVAV (steps S321 to S329).

It is decided on the basis of a latitude $\Delta BV$ of the film 205 whether the luminance of each pixel exceeds VBAV+$\Delta BV$. If the luminance exceeds VBAV+$\Delta BV$, an address i of the corresponding pixel is stored. It is decided on the basis of the latitude of $\Delta BV$ of the film 205 whether the luminance of each pixel is not smaller than BVAV−$\Delta BV$. If the luminance is smaller than BVAV−$\Delta BV$, an address i of the corresponding pixel is stored (steps S330 to S336). The signal synthesizing circuit 222 operates for the addresses stored as described above to color only the above areas of the image on the monitor 224, thereby performing an over/under display (steps S337 and S338).

Figure 32:
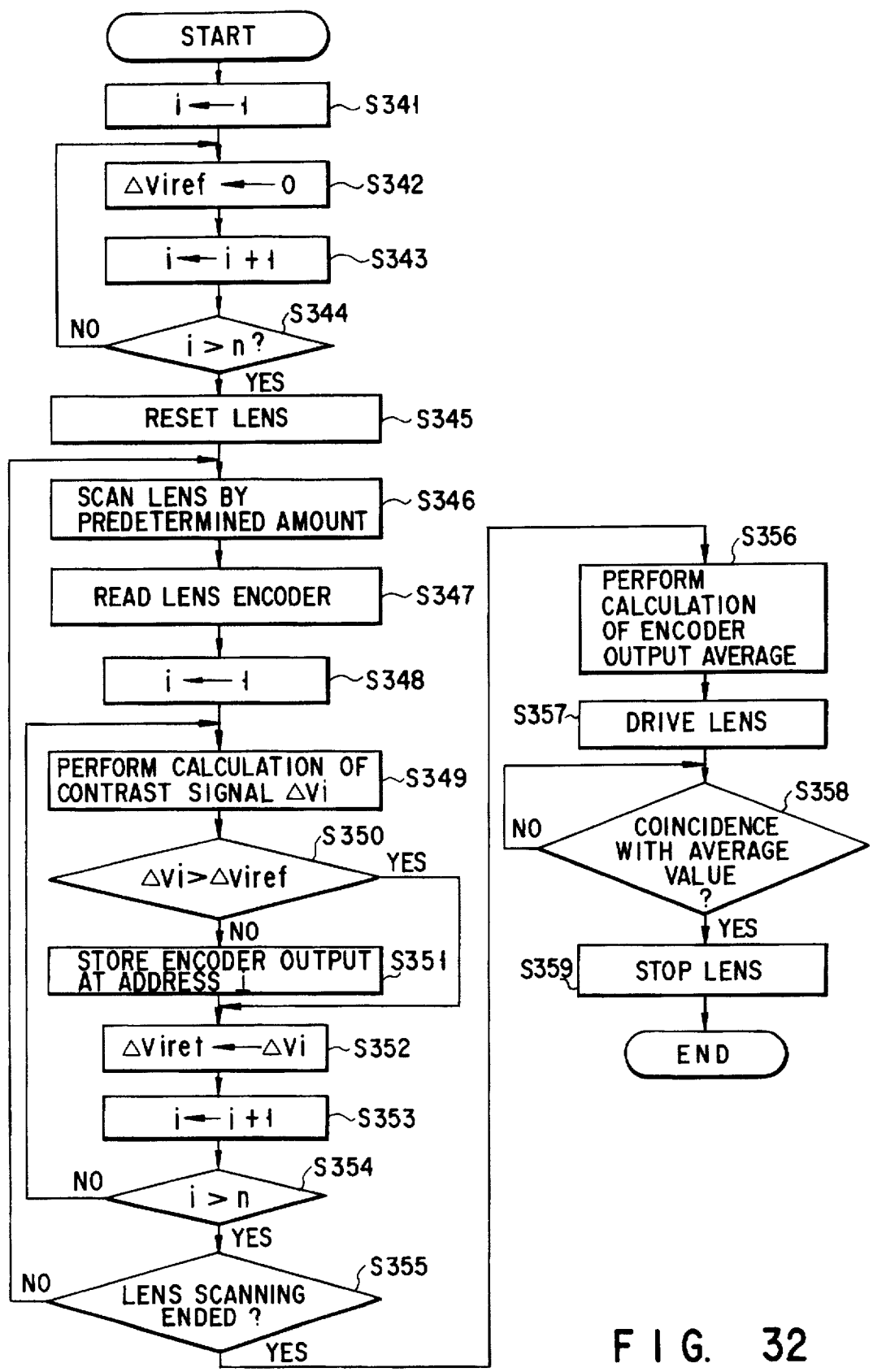
FIG. 32 is a flow chart of AF lens control.

FIG. 32 is a flow chart of AF lens control. In this case, it is assumed that an entire screen is divided into n areas, and the following description will be performed.

All contrast reference signals $\Delta V$iref (i=1 to n) are cleared (steps S341 to S344). The lens is reset and then extended by a predetermined small amount (steps S345 and S346).

A contrast signal ΔVi of each area is calculated and compared with the contrast reference signal ΔViref. If the contrast signal ΔVi is larger than the contrast reference signal ΔViref, the contrast signal ΔVi is stored in place of the contrast reference signal ΔViref, and the contrast signal of the next area is detected. When this process is repeated, and the contrast signal ΔVi becomes smaller than the contrast reference signal ΔViref, it is considered that a balanced contrast signal exceeds the peak of a hill-climbing signal. For this reason, at this time, an output from the encoder is stored in the address storing circuit 221 (steps S348 to S355).

When this operation is repeated, an encoder output value having one peak is stored for each area (total of n encoder output values). When the average of the n encoder outputs is calculated, the average is the peak of an average contrast signal on the entire screen. At this time, when the lens is extended, the best focus position for the entire screen can be obtained (steps S356 to S359).

Figure 33:
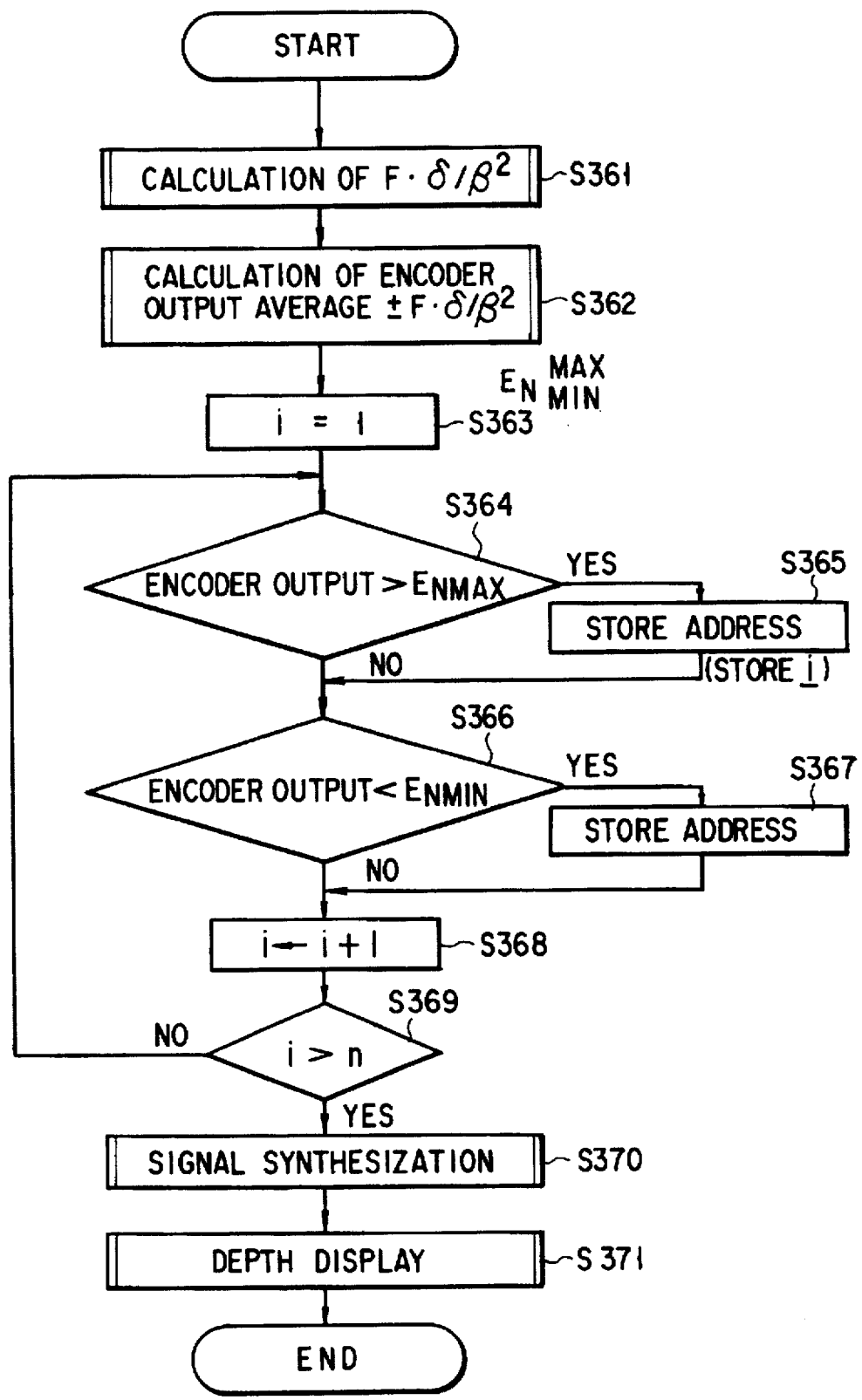
FIG. 33 is a flow chart showing a sequence for performing depth display on the basis of n encoder values.

FIG. 33 is a flow chart showing a sequence of a depth display performed on the basis of n encoder values. $F \cdot \delta/\beta^2$ (allowable defocus amount) is calculated first, $\pm F \cdot \delta/\beta^2$ are calculated with respect to the focus position obtained in FIG. 32 (steps S361 and S362). If the encoder value of each area is larger than ENMAX or smaller than ENMIN, the address (i) of the corresponding area is stored and transmitted to the signal synthesizing circuit 222 (steps S363 to S369). In this case, the signal synthesizing circuit 222 synthesizes an object image with an address signal, colors an in-depth or out-of-depth area of the entire screen, and displays the colored area on the monitor 224 (steps S370 and S371).

FIG. 34 is a flow chart showing a sequence of an over/under AE display in use of an electronic flash.

In this sequence, an object distance is calculated on the basis of an output from the lens position encoder 229, and it is decided whether each area falls within a distance (×1.4 and ×0.7) range of ±1 EV with respect to the object distance. If an area is not within the range, an over/under display is performed by the LCD monitor 224 (steps S381 to S292).

FIG. 35 is a flow chart showing an operation according to the eighth embodiment.

When an over/under AE area is recognized, the area and an over/under amount is recorded on the magnetic recording portion of a film 205 (steps S401 to S405). Since this recording means has various known arrangements, a description thereof will be omitted. In the eighth embodiment, when a printing operation is performed at a digital printer in a processing laboratory, the film can be subject to exposure correction by reading the recorded information.

FIG. 36 is a view showing a camera having a properness/improperness display means according to the ninth embodiment. In the ninth embodiment, unlike in the seventh embodiment, the scheme of an in-focus state detecting system is changed from "a hill-climbing peak detecting scheme, i.e., a contrast scheme" to a well-known trigonometric distance measuring scheme. More specifically, according to the ninth embodiment, a distance measuring lens system 239 is arranged independently of a photographic lens, and both object light from a photographic lens system 201 and object light from the lens system 239 are guided to an image pickup device 209.

In this case, a portion, of the image pickup device 209, which receives the object light from the photographic lens system is divided into n areas, and a portion, of the image pickup device 209, which receives the object light from the lens system 239 is divided into n areas. An interval between two images on the image pickup device 209 is calculated for both the portions by a known method, thereby calculating an absolute object distance for each of the n areas. This is calculated by $X=S \times f/l$ as shown in FIG. 37.

As has been described above, in a camera having a properness/improperness display means according to the seventh to ninth embodiments, information related to AF and AE is calculated on the basis of an image signal from the image pickup device 209 and can be displayed on a monitor 224. Therefore, the display on the monitor allows a user to conform the contents of the AF and AE without requiring the user to perform a cumbersome operation.

Therefore, according to the seventh to ninth embodiments of the present invention, there is provided a camera having a properness/improperness display means capable of allowing a user to rapidly, correctly confirm information related to the AF and AE of an object on an electronic viewfinder.

What is claimed is:

1. A camera into which a film having a magnetic information recording section can be loaded, said camera comprising:

(a) an imaging device for forming an electronic image of an object;

(b) a release button;

(c) an exposure device for exposing said object on said film in response to an operation of said release button;

(d) a recording device for recording said electronic image output from said imaging device in combination with an operation of said exposure device;

(e) an image monitor for displaying said electronic image which has been recorded on said recording device;

(f) a post-processing information input device for setting at least one of the following information:
 i) exposure correction information at a time of printing,
 ii) color correction information,
 iii) trimming information, and
 iv) information on a number of prints,
while monitoring said electronic image displayed on said monitor;

(g) a superimposing device for displaying one of:
 i) a character, and
 ii) a symbol
corresponding to said information, together with said electronic image, on said image monitor, such that said information set by said post-processing information input device can be confirmed; and (h) a magnetic recorder for recording said information on said magnetic information recording section of said film while feeding said film, after said information is set by said post-processing information input device.

2. A camera comprising:

(a) a camera body into which a film having a magnetic information recording section can be loaded;

(b) an exposure device for exposing an object on said film;

(c) an imaging device for imaging and recording an electronic image equivalent to an image of said object, in combination with an operation of said exposure device;

(d) an image monitor for displaying said electronic image;

(e) an information input device for setting processing information at a time of printing while monitoring said electronic image displayed on said image monitor, said information input device setting at least one of the following information:
 i) exposure correction information at a time of printing, ii) color correction information, iii) trimming information, and iv) information on a number of prints;

(f) a superimposing device for displaying said processing information set by said information input device, together with said electronic image, on said image monitor, said superimposing device displaying one of:

i) a character, and ii) a symbol, such that said information set by said information input device can be confirmed; and (g) an information recorder for recording said processing information set by said information input device on said magnetic information recording section of said film while feeding said film, after said information is set by said information input device.

* * * * *